(12) United States Patent
Ellis et al.

(10) Patent No.: US 11,375,841 B2
(45) Date of Patent: *Jul. 5, 2022

(54) COMPRESSION PAD WINDOW HANGING DEVICES AND SYSTEMS

(71) Applicant: Syll Innovations, LLC, Poughkeepsie, NY (US)

(72) Inventors: Lisa Marie Ellis, Marlboro, NY (US); Dennis Gerard Ellis, Marlboro, NY (US)

(73) Assignee: Syll Innovations, LLC, Poughkeepsie, NY (US)

( * ) Notice: Subject to any disclaimer, the term of this patent is extended or adjusted under 35 U.S.C. 154(b) by 896 days.

This patent is subject to a terminal disclaimer.

(21) Appl. No.: 16/112,050

(22) Filed: Aug. 24, 2018

(65) Prior Publication Data
US 2019/0059626 A1    Feb. 28, 2019

Related U.S. Application Data

(60) Provisional application No. 62/550,202, filed on Aug. 25, 2017.

(51) Int. Cl.
*A47H 27/00* (2006.01)
*A01K 1/035* (2006.01)
(Continued)

(52) U.S. Cl.
CPC ........... *A47H 27/00* (2013.01); *A01K 39/014* (2013.01); *A47G 7/044* (2013.01); *E06B 7/28* (2013.01); *G09F 7/18* (2013.01); *G09F 17/00* (2013.01)

(58) Field of Classification Search
CPC .... A01K 39/014; A01K 1/0356; A01K 31/14; A01K 39/0113; A01K 39/04;
(Continued)

(56) References Cited

U.S. PATENT DOCUMENTS 1,446,231 A    2/1923 West
1,448,235 A    3/1923 Read
(Continued)

FOREIGN PATENT DOCUMENTS

CA    172031    5/2018
CA    3032508 C    12/2019
(Continued)

OTHER PUBLICATIONS

Notice of Allowance corresponding to U.S. Appl. No. 29/663,227 dated Jul. 14, 2020.
(Continued)

*Primary Examiner* — Yvonne R Abbott-Lewis
*Assistant Examiner* — Yvonne Abbott
(74) *Attorney, Agent, or Firm* — Jenkins, Wilson, Taylor & Hunt, P.A.

(57) ABSTRACT

Provided herein are compression pad window hanging devices and systems. Compression pad window hanging devices include a compression pad attached to an item, with the compression pad designed to be compressed between the lower sash of a closed window and a window sill to thereby secure the item in place on an exterior or interior of the window. Such window hanging devices can include one or more adjustable support members extending from a bottom of the item to support the item on the exterior or interior window sill ledge and compensate for a downward slope of the exterior or interior window sill ledge. Bird feeders, flags, decorations and storage systems are examples items to be secured to a window sill using a compression pad window hanging device and system as disclosed herein.

17 Claims, 14 Drawing Sheets

(51) Int. Cl.
*E06B 7/28* (2006.01)
*A47G 7/04* (2006.01)
*G09F 7/18* (2006.01)
*A01K 39/014* (2006.01)
*G09F 17/00* (2006.01)

(58) Field of Classification Search
CPC .. A01K 5/0114; A01K 39/0206; A47H 27/00; A47G 7/044
USPC ............. 119/57.8, 61.3, 61.57; 248/208, 236
See application file for complete search history.

(56) References Cited

U.S. PATENT DOCUMENTS

| | | |
|---|---|---|
| 1,512,792 A | 10/1924 | Nelson |
| D66,767 S | 3/1925 | Foster et al. |
| 1,543,739 A | 6/1925 | Vowels |
| 1,786,777 A | 12/1930 | Pfeiffer |
| 1,918,429 A | 7/1933 | Schall et al. |
| 2,151,010 A | 3/1939 | Copeman |
| 2,235,959 A | 3/1941 | Copeman |
| 2,302,737 A * | 11/1942 | Bearden ................ A47G 7/044 248/208 |
| D142,561 S | 10/1945 | Hyde |
| 2,430,541 A | 11/1947 | Thatcher |
| 2,531,915 A | 11/1950 | Maly |
| 2,544,203 A | 3/1951 | Watkins |
| 2,661,719 A | 12/1953 | Scheidt et al. |
| 2,718,874 A | 9/1955 | Dunn |
| 2,718,921 A | 9/1955 | Alleva |
| D180,173 S | 4/1957 | Bennett |
| 2,806,746 A | 9/1957 | Hughes |
| 2,937,617 A | 5/1960 | Brody et al. |
| 2,966,272 A | 12/1960 | Mackenzie |
| D194,109 S | 11/1962 | Dilley |
| 3,076,433 A | 2/1963 | Kofsky et al. |
| 3,086,499 A | 4/1963 | Dilley |
| 3,089,461 A | 5/1963 | Dunn |
| 3,122,129 A | 2/1964 | Wise |
| D198,568 S | 7/1964 | Clever |
| 3,211,130 A | 10/1965 | Prince |
| 3,282,251 A | 11/1966 | Dahmus |
| 3,291,100 A | 12/1966 | Negaard |
| 3,314,397 A | 4/1967 | Jacobsen |
| D225,215 S | 11/1972 | Francis |
| 3,885,768 A | 5/1975 | Frye |
| D237,730 S | 11/1975 | Hansen et al. |
| 4,048,754 A | 9/1977 | Laux |
| 4,261,294 A | 4/1981 | Bescherer |
| 4,335,547 A | 6/1982 | Maxwell |
| 4,361,116 A | 11/1982 | Kilham |
| 4,437,432 A | 3/1984 | Immeyer et al. |
| D274,013 S | 5/1984 | Sun |
| 535,020 A | 3/1985 | Powell |
| 4,559,738 A * | 12/1985 | Helfman ................ A47G 7/044 47/67 |
| 4,637,344 A | 1/1987 | Peterson |
| 4,649,865 A | 3/1987 | Riggi |
| D290,414 S | 6/1987 | Gerber |
| D291,610 S | 8/1987 | Metzner |
| D302,751 S | 8/1989 | Baldwin |
| D302,752 S | 8/1989 | Baldwin |
| 4,869,451 A | 9/1989 | Gordon |
| 4,881,491 A | 11/1989 | Brown |
| 4,892,060 A | 1/1990 | Lundquist |
| D308,495 S | 6/1990 | Honeycutt |
| 5,016,571 A | 5/1991 | Totaro |
| 5,050,831 A | 9/1991 | Joyal |
| D330,272 S | 10/1992 | Lane |
| D334,636 S | 4/1993 | Honeycutt |
| D342,587 S | 12/1993 | Bransky et al. |
| D342,588 S | 12/1993 | Bransky et al. |
| D342,589 S | 12/1993 | Bransky et al. |
| D342,590 S | 12/1993 | Bransky et al. |
| D350,627 S | 9/1994 | Moniak |
| D351,690 S | 10/1994 | Honeycutt |
| D355,990 S | 3/1995 | Vincelli |
| D361,238 S | 8/1995 | Richards et al. |
| 5,469,807 A | 11/1995 | Kosmaczeska |
| D365,893 S | 1/1996 | Thorp |
| D380,066 S | 6/1997 | Green et al. |
| D381,135 S | 7/1997 | Hochlan, Jr. |
| 5,709,164 A | 1/1998 | Batterton |
| D396,331 S | 7/1998 | Niemetz |
| D396,334 S | 7/1998 | Gutierrez |
| 5,855,184 A * | 1/1999 | Eichler ................ A01K 1/0356 119/51.5 |
| D407,863 S | 4/1999 | Leal et al. |
| 5,904,330 A | 5/1999 | Manico et al. |
| 5,967,478 A * | 10/1999 | Tynes ................ A47B 45/00 248/208 |
| 6,062,167 A | 5/2000 | Soley |
| 6,314,912 B1 | 11/2001 | Armbruster |
| 6,334,407 B1 | 1/2002 | Schneider |
| 6,397,779 B1 | 6/2002 | Bonne |
| 6,581,891 B1 | 6/2003 | Byrd |
| 6,749,163 B1 * | 6/2004 | Lee ................ A47B 96/027 248/236 |
| D501,960 S | 2/2005 | Oen |
| 6,857,394 B2 | 2/2005 | Redford |
| D515,246 S | 2/2006 | Lory, II |
| D522,185 S | 5/2006 | Donegan |
| 7,162,972 B2 | 1/2007 | Stachowiak |
| D561,955 S | 2/2008 | McDonough |
| D566,906 S | 4/2008 | Rogers |
| 7,392,763 B2 | 7/2008 | Willinger et al. |
| D657,919 S | 4/2012 | Papworth |
| D658,338 S | 4/2012 | Law |
| 9,814,305 B2 * | 11/2017 | Brus ................ E04H 17/14 |
| 9,909,712 B1 * | 3/2018 | Darby ................ A47G 7/044 |
| 10,064,478 B2 | 9/2018 | Brooks |
| D831,899 S | 10/2018 | Ellis et al. |
| 10,194,642 B2 * | 2/2019 | Ellis ................ A01K 1/035 |
| D853,662 S | 7/2019 | Ellis et al. |
| D863,693 S | 10/2019 | Ellis et al. |
| 10,687,517 B2 | 6/2020 | Tribble |
| D901,786 S | 11/2020 | Ellis et al. |
| 11,059,424 B2 * | 7/2021 | Hatfield ................ B60R 7/043 |
| 2003/0161147 A1 | 8/2003 | Chang |
| 2006/0137618 A1 | 6/2006 | Poirier et al. |
| 2007/0169706 A1 | 7/2007 | Vagedes et al. |
| 2008/0134430 A1 | 6/2008 | Kirmon |
| 2009/0223456 A1 | 9/2009 | Hunter et al. |
| 2010/0175630 A1 | 7/2010 | Stetson |
| 2015/0342153 A1 * | 12/2015 | Hudepohl ............ F16M 13/022 119/57.8 |
| 2016/0165855 A1 | 6/2016 | MacKelvie |
| 2017/0195551 A1 | 7/2017 | Klein |
| 2018/0035650 A1 | 2/2018 | Ellis |
| 2018/0064070 A1 | 3/2018 | Brunnberg |
| 2018/0295814 A1 | 10/2018 | Tribble |
| 2019/0059626 A1 | 2/2019 | Ellis et al. |

FOREIGN PATENT DOCUMENTS

| | | |
|---|---|---|
| CN | 202 680 217 U | 1/2013 |
| EP | 3673138 A1 | 7/2020 |
| EP | 3493668 B1 | 1/2021 |
| MX | 55896 | 7/2019 |
| MX | 57448 | 1/2020 |
| WO | WO 2018/027120 A1 | 2/2018 |
| WO | WO 2019/040861 A1 | 2/2019 |

OTHER PUBLICATIONS

Notice of Allowability corresponding to U.S. Appl. No. 29/636,675 dated Aug. 26, 2019.
Notice of Allowance corresponding to Mexican Design Application No. MX/f/2019/000007 dated Oct. 25, 2019.
Notice of Publication corresponding to European Patent Application No. 18849376.1 dated Jun. 4, 2020.

(56) References Cited

OTHER PUBLICATIONS

Intent to Grant corresponding to European Patent Application No. 17837749.5 dated Jul. 23, 2020.
International Preliminary Report on Patentability corresponding to International Application No. PCT/US2018/047938 dated Feb. 25, 2020.
Notification Concerning Transmittal of International Preliminary Report on Patentability (Chapter I) corresponding to International Application No. PCT/US2017/045474 dated Feb. 14, 2019.
Decision to Grant corresponding to European Patent Application No. 17837749.5-1011 dated Dec. 10, 2020.
"Window Bird Feeders," Duncraft, Wild Bird Superstore, www.duncraft.com/Window-Bird-Feeders?view_all (2017). [Retrieved Jan. 6, 2017].
"Mirrored Windowsill Feeder, Item No. 25900," Coveside Conservation Products, Casco, Maine 04015, https://www.coveside.com/_store/card_view.asp?itemnr=25900 (Date Unknown). [Retrieved Jan. 6, 2017].
Watchers Choice™ Feeders: World's Best Window Feeder, http://www.watcherschoice.com/ (2013). [Retrieved Jan. 6, 2017].
"Birding Company 78621 Songview In-House Window Feeder—Natural," GoSale: Compare & Save, America's Largest Price Comparison Website, http://www.gosale.com/4483766/birding-company-78621 (2017). [Retrieved Jan. 6, 2017].
"Panoramic In-House Window Feeder, Item No. 26400," Coveside Conservation Products, Casco, Maine 04015, https://www.coveside.com/_store/card_view.asp?itemnr=26400 (Date Unknown). [Retrieved Jan. 6, 2017].
"Mirrored Panoramic In-House Window Feeder, Item No. 26500," Coveside Conservation Products, Casco, Maine 04015, https://www.coveside.com/_store/card_view.asp?itemnr=26500 (Date Unknown). [Retrieved Jan. 6, 2017].
"Bread Box Window Feeder, Item No. 27000," Coveside Conservation Products, Casco, Maine 04015, https://www.coveside.com/_store/card_view.asp?itemnr=27000 (Date Unknown). [Retrieved Jan. 6, 2017].
"Bread Box Window Feeder with 2-way Mirror, Item No. 27500," Coveside Conservation Products, Casco, Maine 04015, https://www.coveside.com/_store/card_view.asp?itemnr=27500 (Date Unknown). [Retrieved Jan. 6, 2017].
Certificate of registration for European Design Application No. 003522150-001 dated Dec. 16, 2016.
Certificate of registration for European Design Application No. 003522150-002 dated Dec. 16, 2016.
Certificate of registration for European Design Application No. 003522150-003 dated Dec. 16, 2016.
Certificate of registration for European Design Application No. 003522150-004 dated Dec. 16, 2016.
Certificate of registration for European Design Application No. 003522150-005 dated Dec. 16, 2016.
Certificate of registration for European Design Application No. 003522150-006 dated Dec. 16, 2016.
Certificate of registration for European Design Application No. 003522150-007 dated Dec. 16, 2016.
International Search Report and Written Opinion for Application No. PCT/US2017/045474 dated Oct. 26, 2017.
Restriction Requirement for U.S. Appl. No. 29/573,349 dated Mar. 28, 2018.
Notice of Publication for U.S. Appl. No. 15/228,642 dated Feb. 8, 2018.
Notice of Publication for Application No. PCT/US2017/045474 dated Feb. 8, 2018.
Notice of Publication for Application No. PCT/US2018/047938 dated Feb. 28, 2019.
Notice of Certification of Registration for Canadian Application No. 172031 dated May 7, 2018.
Non-Final Office Action for U.S. Appl. No. 15/228,642 dated Jun. 14, 2018.
Notice of Allowance for U.S. Appl. No. 29/573,349 dated Jun. 21, 2018.
Notice of Allowance for U.S. Appl. No. 15/228,642 dated Oct. 2, 2018.
Office Action corresponding to Mexican Patent Application No. MX/f/2016/004082 dated Oct. 19, 2018.
Notificiation of Transmittal of the International Search Report and Written Opinion corresponding to International Application No. PCT/US2018/047938 dated Dec. 27, 2018.
Notice of Allowance corresponding to U.S. Appl. No. 29/663,228 dated Feb. 4, 2019.
Office Action (Examiner's Report and Search Report) corresponding to Canadian Patent Application No. 3,032,508 dated Mar. 8, 2019.
Notice of Allowance corresponding to Mexican Patent Application No. MX/f/2016/004082 dated Mar. 22, 2019.
Office Action (Examiner's Report and Search Report) corresponding to Canadian Patent Application No. 3,032,508 dated Apr. 17, 2019.
Notice of Allowability corresponding to U.S. Appl. No. 29/663,228 dated May 15, 2019.
Notice of Publication corresponding to European Patent Application No. 17837749.5 dated May 15, 2019.
Notice of Allowance corresponding to U.S. Appl. No. 29/636,675 dated May 16, 2019.
Office Action corresponding to European Patent Application No. 17837749.5 dated Jul. 16, 2019.
Notice of Allowance corresponding to Canadian Patent Application No. 3,032,508 dated Jun. 5, 2019.
Extended European Search Report corresponding to European Application No. 18849376.1-1002 dated May 10, 2021.

* cited by examiner

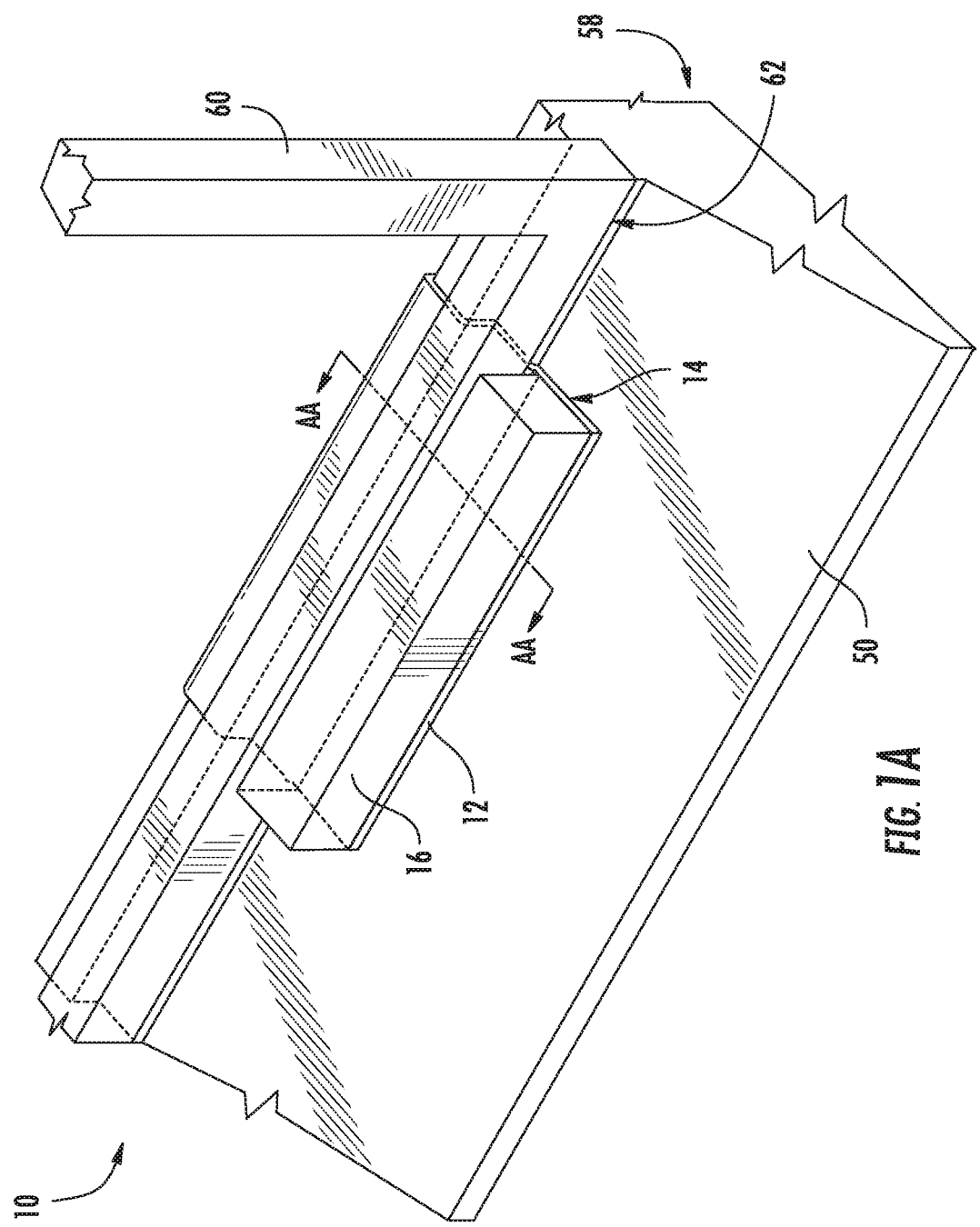

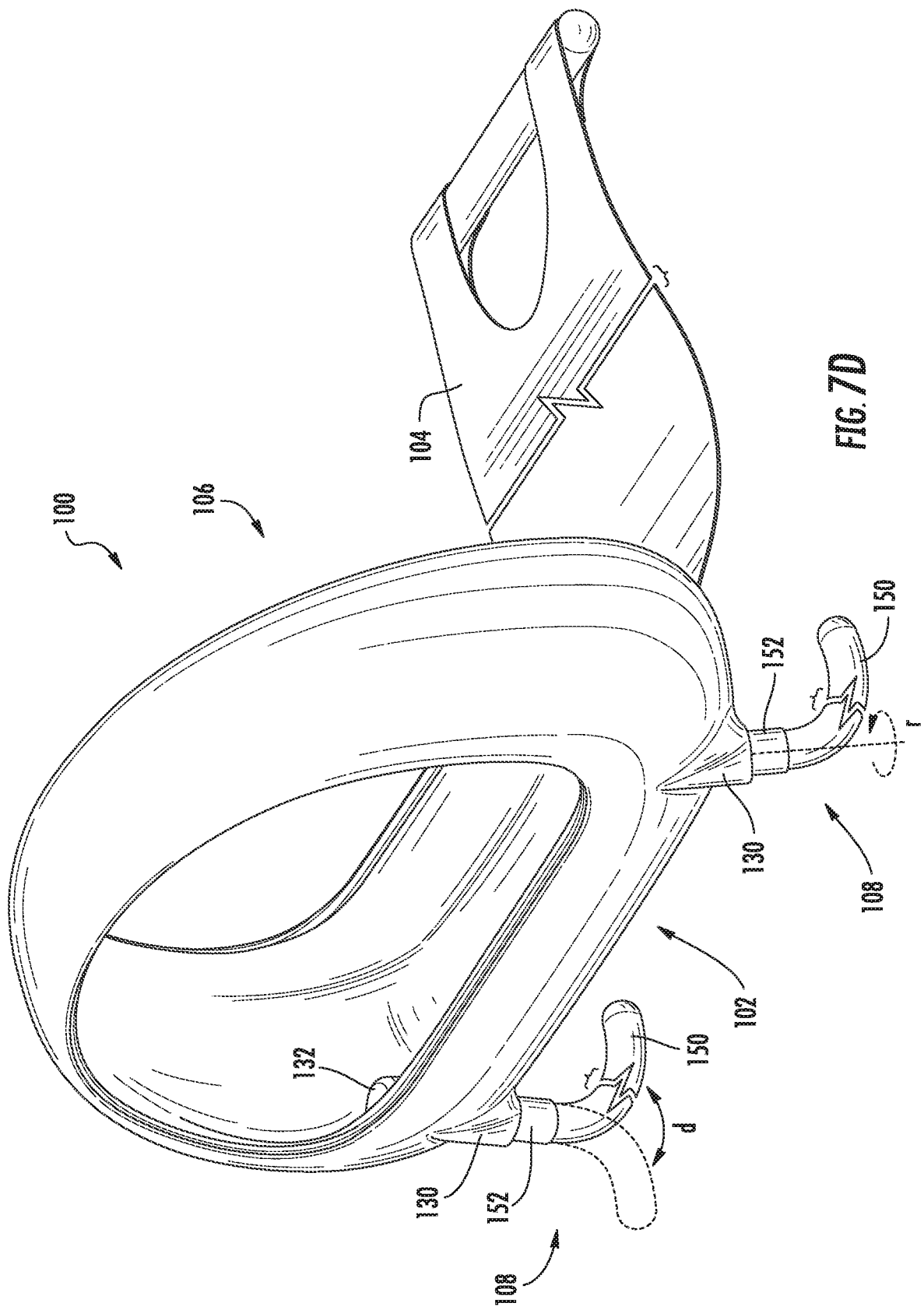

COMPRESSION PAD WINDOW HANGING DEVICES AND SYSTEMS

CROSS REFERENCE TO RELATED APPLICATION

The present application claims priority to U.S. Patent Application Ser. No. 62/550,202, filed on Aug. 25, 2017, the disclosure of which is incorporated herein by reference in its entirety.

TECHNICAL FIELD

The presently disclosed subject matter relates to devices, apparatuses, systems and methods for hanging items from a window or window sill for purposes of, for example, decoration, signage, security and bird feeding. The presently disclosed subject matter also relates to the use of bird feeders and related devices configured to hang from a window to provide feeding, observing and caring for avian species.

BACKGROUND

Homeowners, tenants of residences, and residents in dwellings, buildings, structures and the like often find it desirable or necessary to hang items from the outside of the home, dwellings, buildings and structures. What is needed is a safe and secure mechanism, device or system to securely hang or position items from a surface of a structure, including for example, a window.

Moreover, bird watching, or birding, is a worldwide recreational and educational activity that includes the observation of birds by the naked eye, through a visual enhancement device like binoculars and telescopes, or by listening for bird sounds. The observation of birds and other wildlife can often times be enhanced by providing food to attract the birds to a desired location, including private residences, office buildings, parks and the like. Bird watchers and wildlife enthusiasts find enjoyment in observing and providing food for these wild avian species.

There are currently numerous bird feeding devices available in the marketplace. Many provide desirable features intended to enhance the enjoyment of feeding and observing birds. However, most of the currently available bird feeder designs require a user to go outside of a residence or dwelling, or utilize unreliable window attachment systems or precariously hang outside of a window, to attend to the feeder and replenish food sources. During inclement weather, and/or for elderly or disabled persons or those residing on the upper floors of buildings, such may not be desirable or even possible. Moreover, in some instances it can be beneficial to have a feeder positioned near a window to facilitate up-close bird watching from the indoors through the window.

Thus, a need remains for devices, apparatuses, systems and methods for feeding, observing and caring for birds. Particularly, what is needed is an effective and reliable bird feeder that can be easily and safely installed, secured in place, replenished, maintained and observed from indoors.

Both of these needs are addressed by the devices, apparatuses, systems and methods disclosed herein.

SUMMARY

The presently disclosed subject matter provides devices, apparatuses, systems and methods for feeding, observing and caring for birds. The presently disclosed subject matter also relates to the use of bird feeders and related devices configured to provide a feeding system for avian species.

Provided herein are compression pad window hanging devices and/or systems, comprising an item to be secured by a lower sash of a window, and a compression pad attached to the item and extending from a portion of the item, wherein the compression pad is configured to be compressed between the lower sash of a closed window and a window sill and/or window jamb to thereby secure the item in place on an exterior or interior of the window. In some embodiments, the item is configured to be secured by a lower window sash and rest on an exterior or interior window sill ledge on the outside or inside of a window. In some embodiments, the window hanging devices and/or systems further comprise one or more adjustable support members extending from a bottom of the item, wherein the one or more adjustable support members are configured to support the item on the exterior or interior window sill ledge and compensate for a downward slope of the exterior or interior window sill ledge, and/or to support the item against a structure or building where there is no sill.

In some embodiments, the compression pad is permanently affixed to the item and extends in a planar direction away from a portion of the item. In some embodiments, the compression pad is secured to the item by an attachment element. In some embodiments, the window hanging devices and systems further comprise an attachment element attached to the compression pad and configured to support and/or secure the item. In some embodiments, the compression pad comprises a sheet of material sufficiently flexible to be sandwiched between the sash of a closed window and a window sill and/or window jamb yet sufficiently strong to securely hold the item in place.

In some aspects, the compression pad comprises a material selected from marine cloth, marine vinyl, silicone, plastic, leather, fabric, mesh or similar netting, yarn, twine, malleable metal, rubber, oil cloth, a pliable material and combinations thereof. In some embodiments, the compression pad further comprises a weight at a terminal end of the compression pad, wherein the weight is configured to cause the compression pad to drape over the window sill on the inside and/or outside of the window.

In some embodiments, the item comprises a bird feeder, disposable bird feeder, a bird house, a bird bath, a hummingbird feeder, a squirrel feeder, a planter, a planter with a trellis, a basket, a security camera, a decoration and/or an ornamental component, and/or a country's flag or signs, banners or similar window displays designed to advertise, inform, announce, or otherwise convey information to passersby. In some embodiments, the adjustable support members comprise a material sufficiently flexible to be moldable or otherwise adjustable to a desired height or position, yet rigid enough to support the weight of the hanging device.

In some embodiments, the compression pad comprises a handle configured to allow a user to grip the compression pad. In some embodiments, a length of the compression pad extending from the item is adjustable.

Also provided herein are compression pad window hanging devices and/or systems comprising an item to be secured by a lower sash of a window, a compression pad attached to the item and extending from a portion of the item, and one or more adjustable support members configured to support the item when suspended from the window, wherein the support members are flexible to allow adjustment and positioning while being sufficiently strong to support the device, wherein the compression pad is configured to be compressed between the lower sash of a closed window and a window sill and/or window jamb to thereby secure the item in place on the exterior or interior of the window.

In some embodiments, provided herein are bird feeders comprising a basin comprising one or more sides and a bottom and configured to hold bird seed, a compression pad attached to the basin and extending from a bottom rear portion of the basin, and one or more adjustable support members extending from the bottom of the basin, wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the exterior window sill ledge.

In some embodiments, the basin comprises a trough-like structure with an interior space for holding bird seed and an open upper surface configured to allow access to the interior space. In some embodiments, the basin comprises a clear plastic material, a polymer, a metal, a ceramic, glass, terra cotta, clay, wood, coated fabric, fabric or basket material. In some embodiments, the one or more adjustable support members are integrated into the bottom of the basin. In some embodiments, the one or more adjustable support members are removable. In some embodiments, the one or more adjustable support members comprise a material sufficiently flexible to be moldable or otherwise adjustable to a desired height or position, yet rigid enough to support the weight of the hanging device.

In some aspects, the compression pad comprises a handle configured to allow a user to grip the compression pad. In some embodiments, the compression pad is permanently affixed to the bottom of the basin and extends in a planar direction away from a rear portion of the basin. In some embodiments, the compression pad is secured to the bottom of the basin by an attachment element. In some embodiments, the compression pad comprises a sheet of material sufficiently flexible to be sandwiched between a closed window and a window sill yet sufficiently strong to securely hold the bird feeder in place. In some embodiments, the compression pad comprises a material selected from marine cloth, marine vinyl, silicone, plastic, leather, fabric, mesh or similar netting, twine, malleable metal, rubber, oil cloth, a pliable material and combinations thereof. In some embodiments, the compression pad further comprises a weight at a terminal end of the compression pad, wherein the weight is configured to cause the compression pad to drape over the window sill on the inside of the window.

In some embodiments, the feeder further comprises a cover extending above the basin and configured to allow access to the basin from a front and rear portion of the basin. In some embodiments, the cover and basin are molded as a single unitary piece. In some embodiments, the cover and basin are separate pieces, wherein the cover is configured to be attached to the basin, wherein the cover is configured to be removable.

In some embodiments, the bird feeder is configured to be supported on a surface below a window where no window sill is present.

In some aspects, provided herein is a bird feeder comprising a basin comprising at least four sides and a bottom and configured to hold bird seed, a cover extending above the basin and configured to allow access to the basin from a front and rear portion of the basin, a compression pad attached to the basin and extending from a bottom rear portion of the basin, and one or more adjustable support members extending from the bottom of the basin, wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the window sill, and wherein the basin, cover and compression pad are configured as a single unitary piece. In some embodiments, the basin, cover and compression pad are injection, thermo, roto or blow molded as a single unitary piece. In some embodiments, the basin and cover comprise a clear plastic material, a polymer, a metal, a ceramic, glass, terra cotta, clay, wood, coated fabric, fabric or basket material. In some embodiments, the bird feeder is configured to be supported on a surface below a window where no window sill is present.

In some embodiments, provided herein are bird feeder kits comprising a basin comprising one or more sides and a bottom and configured to hold bird seed, a compression pad configured to be attachable to the basin, one or more adjustable support members configured to be attachable to the basin, hardware for attaching the compression pad to the basin, instructions for assembling and using the bird feeder, wherein in the assembled condition the bird feeder is configured to rest on a window sill on the outside of a window, wherein the compression pad is configured to be compressed between a closed window and the window sill to thereby secure the bird feeder in place on the window sill, and wherein the one or more adjustable support members are configured to support the bird feeder on the window sill and compensate for a downward slope of the window sill. In some embodiments, the kits can further comprise a cover configured to be attachable to the basin. In some embodiments, the bird feeder, in the assembled condition, is configured to be used in any single or double hung window or other window having a window sill. In some embodiments, the bird feeder is configured to be supported on a surface below a window where no window sill is present.

In some aspects, provided herein are bird feeders comprising a block of compressed bird seed, and a compression pad attached to and extending from the block of compressed bird seed, wherein the bird feeder is configured to rest on an exterior window sill ledge on the outside of a window, wherein the compression pad is configured to be compressed between a closed window and a window sill to thereby secure the bird feeder in place on the exterior window sill ledge. In some embodiments, the bird feeder further comprises a base to which the block of compressed bird seed is affixed, wherein the compression pad is attached to and extends from a rear portion of the base in a substantially planar direction. In some embodiments, the bird feeder further comprises one or more securing elements configured to secure the block of compressed bird seed to the base, wherein the securing elements extend from the base and into the block of compressed bird seed.

In some embodiments, the compression pad comprises a sheet of material sufficiently flexible to be sandwiched between a closed window and a window sill yet sufficiently strong to securely hold the bird feeder in place. In some embodiments, the bird feeder further comprises the compression pad comprises a material selected from marine cloth, marine vinyl, silicone, plastic, leather, fabric, mesh or similar netting, yarn, twine, malleable metal, rubber, oil cloth, a pliable material and combinations thereof.

In some embodiments, the bird feeder further comprises one or more adjustable support members extending from a bottom of the base, wherein the one or more adjustable support members are configured to support the feeder on an exterior window sill ledge and compensate for a downward slope of the exterior window sill ledge. In some embodiments, the bird feeder is configured to be supported on a surface below a window where no window sill is present. In some embodiments, the bird feeder is configured to be disposable or reusable once the bird seed is consumed.

Provided herein are other embodiments of bird feeders, comprising a bird feeder comprising a container to hold bird feed and configured to allow birds access to the bird feed, and a compression pad attached to and extending from the bird feeder, wherein the bird feeder is configured to rest on an exterior window sill ledge on the outside of a window, wherein the compression pad is configured to be compressed between a closed window and a window sill to thereby secure the bird feeder in place on the exterior window sill ledge. In some embodiments, the compression pad comprises a sheet of material sufficiently flexible to be sandwiched between a closed window and a window sill yet sufficiently strong to securely hold the bird feeder in place. In some embodiments, the compression pad comprises a material selected from marine cloth, marine vinyl, silicone, plastic, leather, fabric, mesh or similar netting, yarn, twine, malleable metal, rubber, oil cloth, a pliable material and combinations thereof. In some embodiments, the bird feeder further comprises one or more adjustable support members extending from a bottom of the bird feeder, wherein the one or more adjustable support members are configured to support the bird feeder on an exterior window sill ledge and compensate for a downward slope of the exterior window sill ledge. In some embodiments, the bird feeder is configured to be supported on a surface below a window where no window sill is present.

Objects of the presently disclosed subject matter having been stated hereinabove, and which are achieved in whole or in part by the presently disclosed subject matter, other objects will become evident as the description proceeds when taken in connection with the accompanying disclosure as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which:

FIG. 1A is a perspective view of a window hanging device in an installed condition as disclosed herein;

FIGS. 7A through 7D are perspective (FIGS. 7A and 7D), side (FIG. 7B) and bottom (FIG. 7C) views of a window hanging device configured as a bird feeder;

DETAILED DESCRIPTION

Figure 1B:
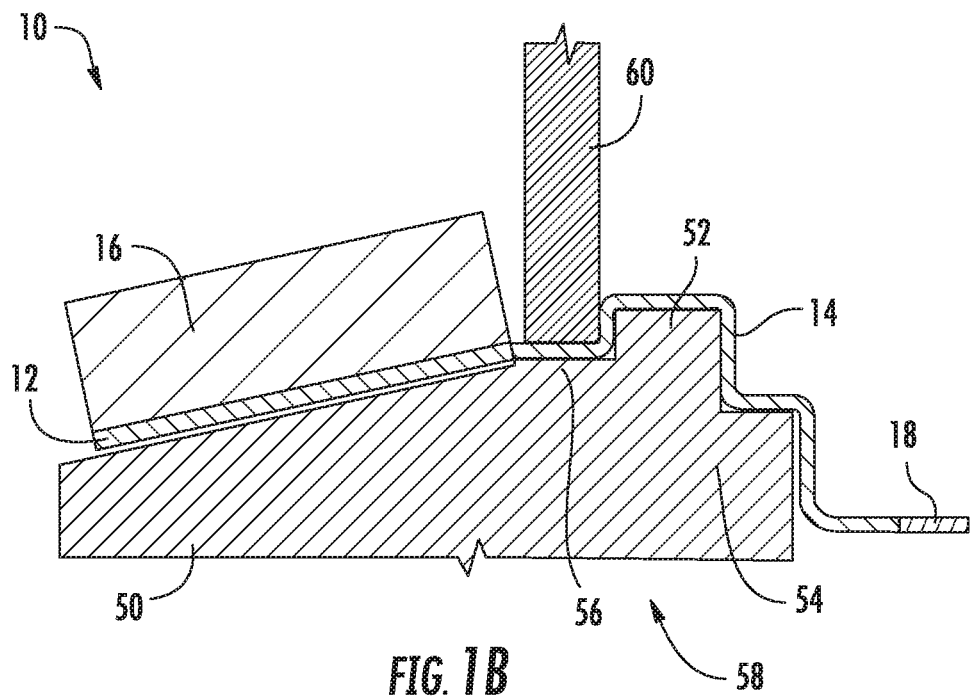
FIGS. 1B and 1C are cross-sectional views of a window hanging device in an installed condition.

The presently disclosed subject matter now will be described more fully hereinafter, in which some, but not all embodiments of the presently disclosed subject matter are described. Indeed, the presently disclosed subject matter can be embodied in many different forms and should not be construed as limited to the embodiments set forth herein; rather, these embodiments are provided so that this disclosure will satisfy applicable legal requirements.

Provided herein are compression pad window hanging devices and systems, including among other things, bird feeders with a compression pad window hanging system. A compression pad made of, for example, marine vinyl, marine cloth, silicone, or other suitable material as disclosed herein, can be affixed to an item intended to be secured by the lower sash of a window, and/or on an outer or inner window sill.

The stationary compression pad can be configured to hold the item in the window by closing the lower sash onto the compression pad (which sits in the bottom track of the window), such that by the window compressing down upon the pad, and in some instances then being locked, the item is secured into place in the window or resting on the outer window sill ledge. For example, the item can rest outside the window on the outer sill, with only the inner portion of the compression pad extending into the house or structure. In some embodiments, even when no window sill is present, the item can be secured by the compression pad.

Similarly, the stationary compression pad can be configured to hold the item in the window by closing the lower sash onto the compression pad (which sits in the bottom track of the window), such that by the window compressing down upon the pad and then fully closed, and in some embodiments also being locked, the item is secured into place in the window while resting on the inner window sill ledge.

To attend to an item resting on the outer window sill ledge, e.g. fill a bird feeder or clean a decoration, one need only to hold onto the portion of the compression pad that is sitting on the inner window sill (for items secured by the lower sash and hanging on the outside of the window), unlock and open the window, and access the item through the opening of the window. Then, while still holding onto the inside portion of the compression pad, the window is lowered onto the pad and closed/locked in place to re-secure the item on the outside of the window. Because the item is positioned directly against, adjacent to or in close proximity to the outside of the window (or on the inside if so desired), it allows for maximum enjoyment of all facets of the item, e.g. watching birds use a bird feeder or observing plants growing in a planter. Similar access is provided for items secured inside the window using the same compression pad secured in the lower window sash.

An item can be installed in a window frame by attaching it to a compression pad and securing the compression pad by sandwiching (or otherwise securing) it between the window frame and window sill when the window frame is in a closed position. The interface between the window frame and the window sill provides sufficient space for the compression pad even when the window is in a fully closed and locked position. This orientation of the compression pad in the closed window secures the item on the outside or inside of the window and prevents it from falling. If positioned at the bottom of the window (versus hanging from the top) the item can be further supported by resting on an exterior or interior window sill ledge (or on the inside, the window frame/trim/inside sill).

The presently disclosed devices and systems for hanging or securing items from a window overcome challenges associated with building security and/or thermal inefficiency since the item is held in place by securing and/or locking the window in a fully closed position. Thus, a window with an item secured with the disclosed systems and devices is just as secure and airtight as the window is without the item. Thus, the building's security system can be activated in most instances. This also allows the items to be used in any weather conditions or seasons since it does not introduce inefficiency in heating/cooling or discomfort from cold or warm outside air entering the structure/building.

The compression pad used in the disclosed devices and systems can comprise any suitable material, including but not limited to marine cloth, marine vinyl, silicone, plastic, leather, fabric, mesh or similar netting, yarn, twine, malleable metal, rubber, oil cloth or any other similar and/or pliable material. Suitable materials are those that are pliable enough to be compressed between a window frame and window sill, yet strong enough to hold the item in position. The compression pad can be provided of any suitable size and/or length so long as it is sufficiently sized to be compressed or secured between a closed window frame and the window sill. For example, the compression pad can be about 5 inches, about 6 inches, about 7 inches, about 8 inches, about 9 inches, about 10 inches, about 11 inches, about 12 inches, about 13 inches, about 14 inches, about 15 inches, about 16 inches, about 17 inches or about 20 inches long, or longer, by about 3 inches, about 4 inches, about 5 inches, about 6 inches, about 7 inches, about 8 inches, about 9 inches or about 10 inches wide, or wider, with a thickness of about $1/64$ inches, $1/32$ inches or about $1/16$ inches or thicker.

In some embodiments the compression pad may consist of two, three or more separate strips of material rather than a single strip or pad. Such strips could be affixed in the same or similar fashion as the single strip or pad would be, and would function in a similar fashion. Such strips can in some embodiments be about 1 inch wide each, about 2 inches wide each, or more.

In some embodiments the compression pads or strips can further comprise a weight or handle at a terminal end that resides inside the structure/building when in the installed position on the outside of a window (or resides outside when in the installed position on the inside of a window). The weight or handle can be configured to hold the compression pad against the interior window sill and wall, and retain it in place until moved by a user. The weight or handle can comprise a metal, wooden or plastic bar for example, and can be sewn into the material of the compression pad or otherwise affixed to the compression pad, or a medallion-like object affixed to the pad. In some embodiments where the material of the compression pad is a pliable material, a weight or handle may not be necessary and can be optional. Also, without such weight or handle, one embodiment could permit the terminal end to be cut to a length to allow it to drape on the inside window sill in a manner preferred by the user.

Support members, or feet, can in some embodiments be provided to support and compensate for any slope or angle in the window sill as it extends away from the window, thereby allowing the item to be leveled or placed in a substantially level position as needed. In some embodiments, the support members can be adjustable and can comprise a flexible or bendable component capable of being positioned to adjust to varying degrees of slope of different window sills to permit the item to rest level and to further support the item. Alternatively, in some aspects support members can be of a fixed position and/or length. In structures/buildings without exterior window sill ledges, these support members may provide further support for the item by resting against the outside wall of the structure/building. This is particularly suitable where the item to be hung or secured outside or inside the window is secured at the bottom of the window on the inner or outer sill. Such adjustable support members also provide additional strength and support for the item to thereby reduce the stress load on the compression pad. Such adjustable support members can be configured as part of the item, e.g. bird feeder, planter, etc., or as part of a mounting base onto which the item is attached, or can be an optional add-on as needed by a user. The structure and orientation of such adjustable support members will become more apparent as illustrated and discussed herein.

In some embodiments one or more adjustable support members can be included in the devices and systems herein to support the item where no window sill is available. In such embodiments the adjustable support members can comprise a flexible or bendable component capable of being positioned to support the item against a structure, e.g. an outer wall, where no window sill is available. Such bendable support members can support and position the item outside the window to which it is secured via the compression pad.

In some embodiments, one or more support members can be integrated into the devices and systems and can comprise a fixed member on a surface, e.g. lower or bottom surface, of the device that provides support and/or leveling of the device on a window sill, or against the structure if no window sill is available.

Turning now to the figures, FIGS. 1A through 1C and 2A through 2B are schematic illustrations of a compression pad window hanging devices 10 as disclosed herein. Such a device/system can comprise an item of interest 16 that is desired to be hung from or secured by a window. The item 16 to be secured can be attached to or otherwise affixed to, permanently or temporarily, a compression pad 14.

FIG. 1A illustrates, as an example only, the item 16 being secured by the lower sash 60 of a window on a lower window sill 58 such that the item 10, e.g. a bird feeder, decorative item, basket, etc., rests on the exterior window sill ledge 50. The compression pad 14 can be sandwiched between the window 60 (or window frame) and the lower window sill 58. The compression pad 14 can extend into the interior of the structure and drape over the interior window sill or trim. Note that the orientation of the item 16 of window hanging devices 10 could be reversed such that the item 16 resides inside the structure (house or dwelling) on the interior window sill.

Figure 1C:
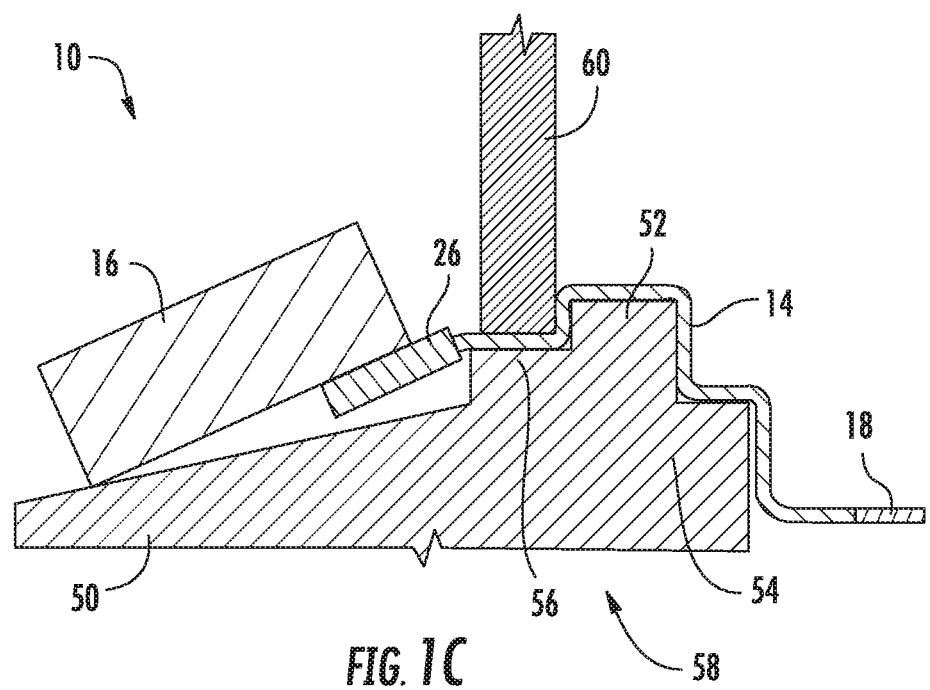

FIG. 1B provides a cross-sectional view of FIG. 1A at cross section AA. FIG. 1C provides an alternate embodiment of item 16 and attachment component 26 in a cross-sectional view similar to that of FIG. 1B. In FIGS. 1B and 1C the securement of the item 10 by sandwiching compression pad 14 between window frame 60 and window sill 58 is clearly illustrated. Window frame 60 can comprise in some embodiments a window frame surrounding glass, and in some embodiments a lower sash of a double hung window that can be raised and lowered. Window sill 58 can comprise a head portion 56 upon which window frame 60 rests in a closed position, a stool portion 52 on an interior side of window frame 60, and/or an apron 54. The exterior side of window sill 58 can comprise an exterior window sill ledge 50. In some embodiments these components of window sill 58 can be made from a single unitary piece, or can be a combination of individual pieces. In some embodiments window sill 58 may have not have one or more of a head portion 56, a stool portion 52 and/or an apron 54. On the exterior portion of window frame 60, and the portion where the feeder resides in the installed position, exterior window sill ledge 50 can in some embodiments have a downward sloping or angled upper surface.

Continuing with FIG. 1B, item 16 of window hanging devices 10 can in some embodiments be supported on and/or affixed to attachment component 12, with attachment component 12 secured to, attached to or integral with compression pad 14. Attachment component 12 can in some embodiments comprise a planar structure, a plate-like structure, or surface of any suitable shape to which item 16 can be secured. As shown in FIG. 1B, attachment component 12 can be of a similar size as item 16, but item 16 can be of any size (larger or smaller than attachment component 16, so long as it can be safely secured to the attachment component. Any suitable means of attachment for securing item 16 to attachment component 12 can be used, including for example but not limited to, screws, bolts, rivets, adhesive, glue, hook and loop attachment material, magnets, and the like.

FIG. 1C shows an alternate embodiment of window hanging devices 10 with a different attachment component 26 than in FIG. 1B. Whereas attachment component 12 in FIG. 1B can serve as a platform upon which item 16 can rest and/or be secured, attachment component 26 can in some embodiments be a smaller element configured to securely attach to item 16 but still allowing item 16 to extend beyond the point of attachment. By way of example and not limitation, attachment component 26 can comprise a hook, clamp, bracket, magnetized surface, hook and loop surface, plate with screws/bolts/rivets, zipper, adhesive, glue or the like that provides for the securement of item 16. Attachment component 26 can be substantially the same width as item 16, or in some embodiments only extend partially the same width as item 16. When attached to attachment component 26 item 16 can rest freely on sill ledge 50 and/or extend beyond the edge of sill ledge 50, e.g. as in a flag or decorative item. Similar to attachment component 12 in FIG. 1B, attachment component 26 can be attached to or integral with compression pad 14.

Figure 2A:
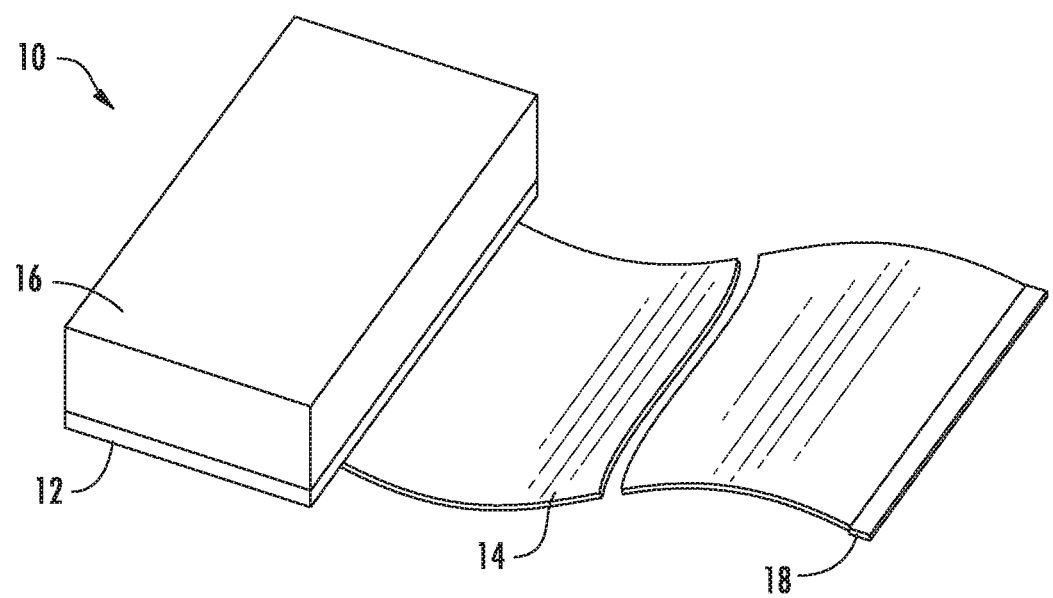
FIGS. 2A and 2B are perspective and profile views, respectively, of a window hanging device as disclosed herein.

FIG. 2A provides a perspective view of a window hanging device 10 prior to installation in a window. By way of example but not limitation, hanging device 10 in FIG. 2A is similar to the configuration of FIG. 2B, but could also be configured as shown in FIG. 1C or any other description herein. Hanging device 10 can comprise an item 16 that is intended to be suspended from a window sill, either on the outside or inside, of a home, building, structure or dwelling. By way of example and not limitation, item 16, though depicted as a generic block structure for simplicity, can comprise a bird feeder, a bird house, a bird bath, a hummingbird feeder, a squirrel feeder, a planter, a planter with a trellis, a basket, a security camera, a decoration and/or an ornamental component, and/or a country's flag or signs and banners or similar window displays designed to advertise, inform, announce, or otherwise convey information to passersby. Item 16 can then be attached or secured to compression pad 14 either directly or by way of attachment component 12 (or attachment component 26 in FIG. 1C). The materials and dimensions of compression pad 14 are described in detail herein. As shown in FIG. 2A, at a terminal end of compression pad 14 a weight 18 or handle can be incorporated as described further herein.

Figure 2B:
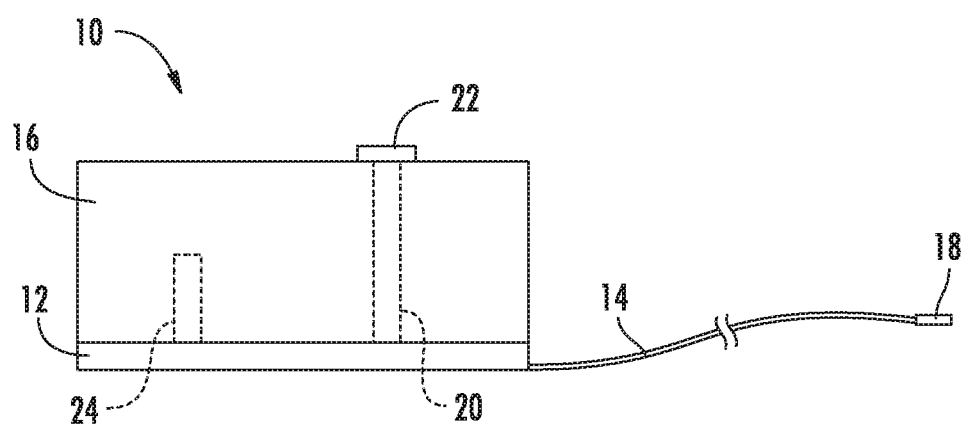

FIG. 2B provides a plan view of a window hanging device 10 prior to installation in a window, and example attachment elements for securing item 16 to attachment component 12. By way of example and not limitation, item 16 can be secured to attachment component 12 by any suitable means, including those detailed herein, including for example a peg 24 or fastener 20. Fastener 20 can comprise a bolt with threaded nut 22, a screw, rivet, nail or the like.

Figure 3A:
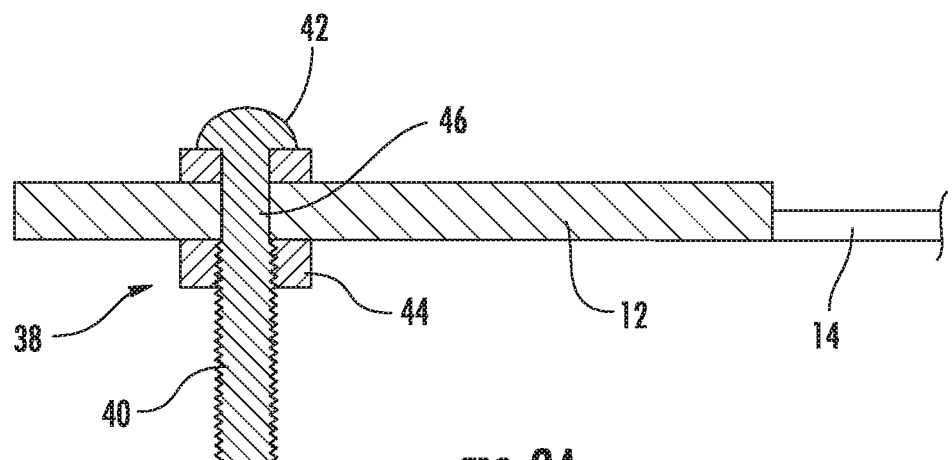
FIGS. 3A through 3D are illustrations of support members on components of window hanging device as disclosed herein.
Figure 3B:
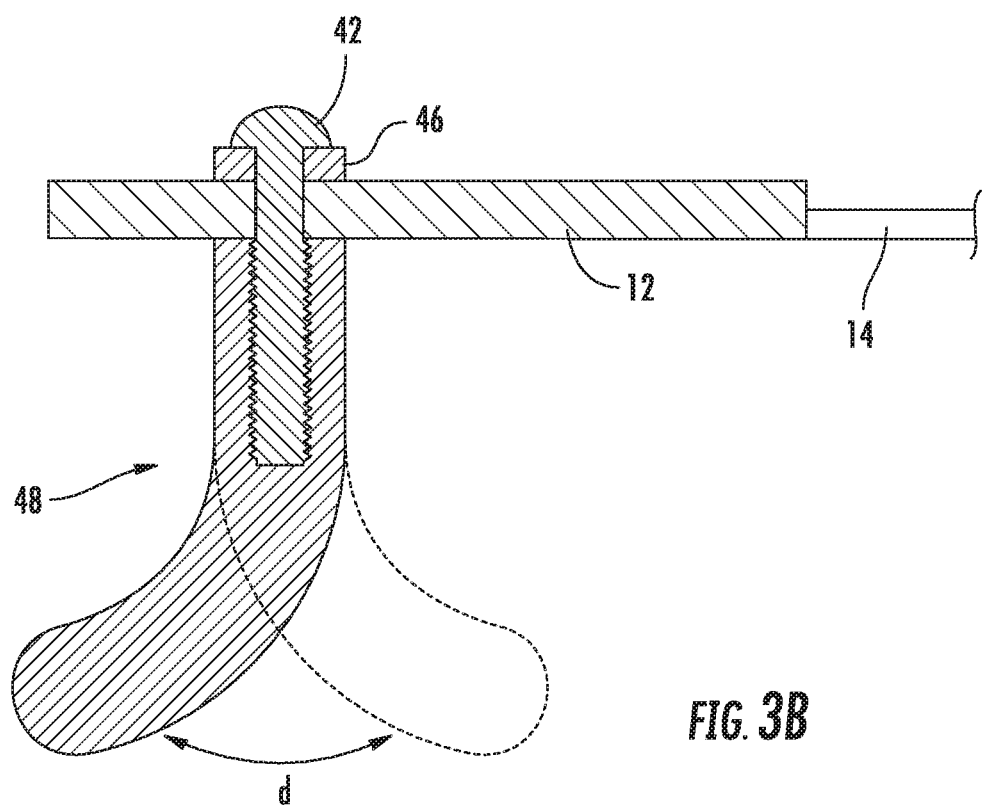

FIGS. 3A and 3B are cross-sectional views of an attachment component 12 and compression pad 14 with one or more support members 38/48, also referred to as "feet". These optional adjustable support members can in some embodiments provide support and compensate for any slope or angle in exterior and/or interior window sill ledge as it extends away from the window thereby allowing the item to be leveled or placed in a substantially level position. In FIG. 3A, adjustable support member 38 can comprise in some embodiments a bolt, screw, or other threaded member that can be configured to have an adjustable height/length. Adjustable support member 38 can comprise a threaded portion 40, a head 42 connected to threaded portion 40 and configured to rotate threaded portion 40 when turned, and/or a nut 44 configured to threadingly receive threaded portion 40. Adjustable support member 38 can in some embodiments comprise a plastic (or other suitable material) screw about one inch long, about 2 inches long, about 2.5 inches long, about 3 inches long, about 3.5 inches long, about 4 inches long or about 5 inches long or longer, and about ¼ inch, about ½ inch, about ¾ inch or about one inch or more in diameter. Adjustable support member 38 can in some embodiments be configured to extend or retract with respect to a bottom surface of attachment component 12.

In FIG. 3B, adjustable support member 48, or bendable feet, can comprise in some embodiments a rubber or similar material with, in some embodiments, a wire or strip of resilient material inside. In some aspects, support member 48 can be made of any flexible/bendable material, such that support member 48 can be bendable and/or malleable yet strong enough to hold once bent into a desired or correct position. Such flexibility of support member 48 can allow them to be positioned in any suitable manner sufficient to compensate for a sill slope or absence of a sill, yet still support the weight of the feeder or other hanging device. Support member 48 can comprise an attachment element 42 to secure it to a attachment component 12 of a window hanging device 10, or to an item 16, or bird feeder or the like. Attachment element 42 can comprise a rod, screw, bolt, threaded member or the like, including in some aspects a nut, washer or securing element 46, sufficient to secure the attachment element or foot to the item of interest. A plurality of sizes of support member 48, or bendable feet, e.g. two or more, can be provided in a kit in the event a given size does not work with a sill arrangement at a given house or structure. In some embodiments the various sizes of feet can be interchangeable such that a user can select the most appropriate size for a given application about one inch long, about 2 inches long, about 2.5 inches long, about 3 inches long, about 3.5 inches long, about 4 inches long or about 5 inches long, and about ¼ inch, about ½ inch, about ¾ inch or about one inch or more in diameter. In some aspects, support member 48 can be about one inch long, about 2 inches long, about 2.5 inches long, about 3 inches long, about 3.5 inches long, about 4 inches long or about 5 inches long, or longer and about ¼ inch, about ½ inch, about ¾ inch or about one inch or more in diameter. Adjustable support member 48 can in some embodiments be configured to extend or retract with respect to a bottom surface of attachment component 12.

Figure 3C:
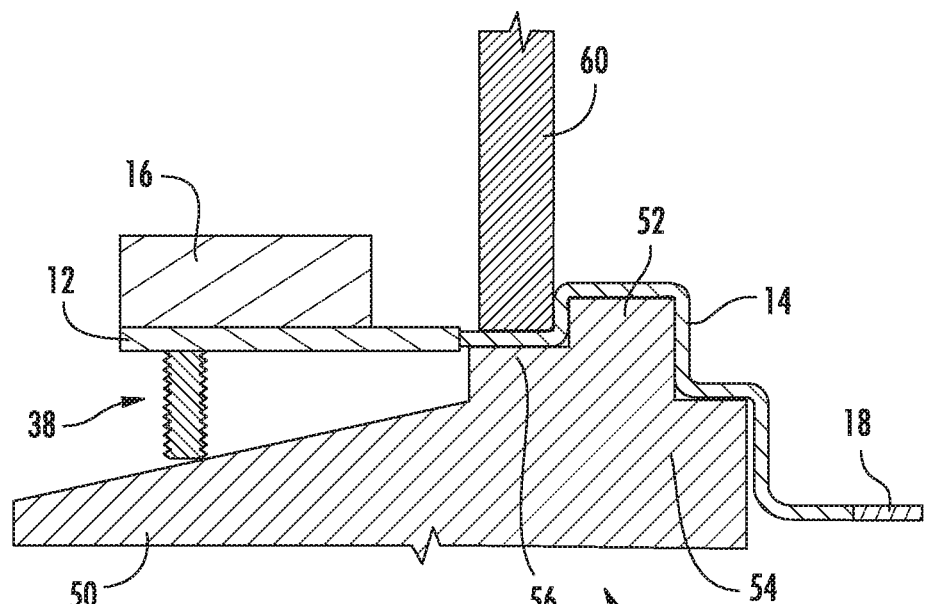
Figure 3D:
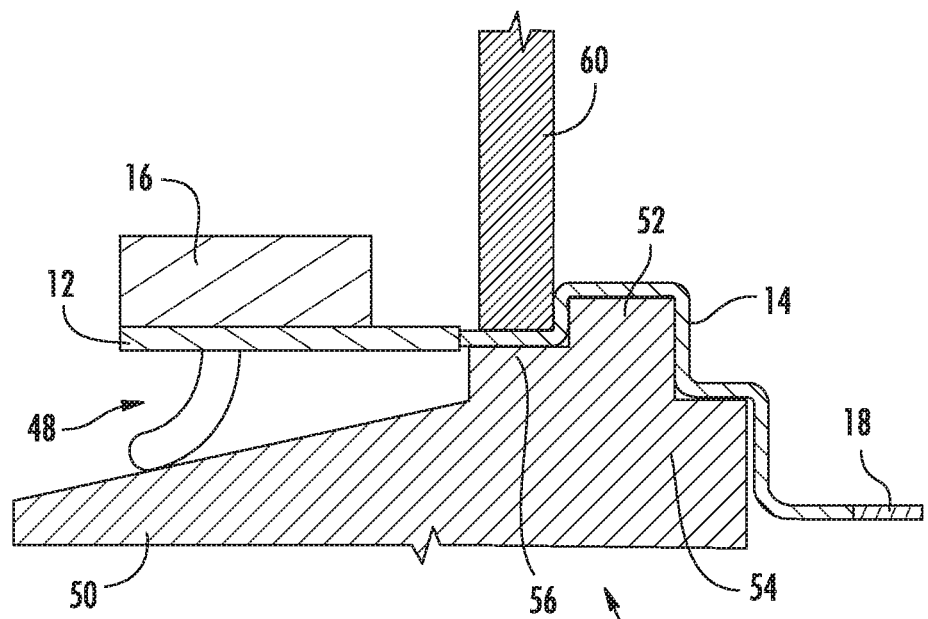

Adjustable support member 38/48 can be adjusted or positioned so as to compensate for the slope or change in elevation of exterior window sill ledge 50 as it slopes away from the window, as shown in FIGS. 3C and 3D, so that attachment component 12 and/or item 16 can be supported on exterior window sill ledge 50 in a level or substantially level position. In some embodiments attachment component 12, or item 16, can comprise one, two, three, four or more adjustable support members 38/48, as needed to adequately support and/or level attachment component 12/item 16. In some embodiments the one or more adjustable support members 38/48 can be positioned at any suitable location on attachment component 12/item 16. The adjustability of adjustable support members 38/48 allows for the use of window hanging devices 10 in any number of window and window sill configurations where the slope/angle of the window sill may vary.

Adjustable support members, or feet, can in some embodiments be provided to support and compensate for any slope or angle in the window sill as it extends away from the window, thereby allowing the item to be leveled or placed in a substantially level position as needed. This is particularly suitable where the item to be hung or secured outside or inside the window is secured at the bottom of the window on the inner or outer sill. Such adjustable support members also provide additional strength and support for the item to thereby reduce the stress load on the compression pad. Such adjustable support members can be configured as part of the item, e.g. bird feeder, planter, etc., or as part of a mounting base onto which the item is attached, or can be an optional add-on as needed by a user. The structure and orientation of such adjustable support members will become more apparent as illustrated and discussed herein.

In some embodiments one or more adjustable support members can be included in the devices and systems herein to support the item where no window sill is available. In such embodiments the adjustable support members can comprise a flexible or bendable component capable of being positioned to support the item against a structure, e.g. an outer (or inner) wall, where no window sill is available. In structures/buildings without exterior (or interior) window sill ledges, these support members may provide further support for the item by resting against the outside (or inside) wall of the structure/building. Such bendable support members can support and position the item outside the window to which it is secured via the compression pad.

In some embodiments, one or more support members can be integrated into the devices and systems and can comprise a fixed member on a surface, e.g. lower or bottom surface, of the device that provides support and/or leveling of the device on a window sill, or against the structure if no window sill is available.

Figure 3E:
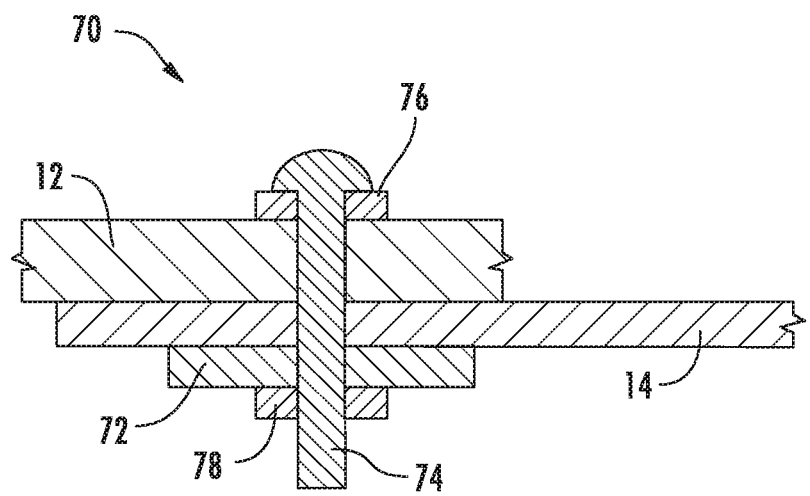
FIG. 3E is a cross-sectional view of an securing element for a window hanging device as disclosed herein.

Turning now to FIG. 3E, in some aspects compression pad 14 affixed to attachment element 12, or directly to item 16, by one or more securing systems 70. In FIG. 3E securing system 70 comprises a screw or bolt configured to secure compression pad 14 to attachment element 12. Securing systems 70 can in some embodiments comprise a threaded portion 74, e.g. a bolt, in some aspects with a head, washer 76 and nut 78. In some embodiments plate 72 can comprise a planar or strip-like element configured to further position and secure compression pad 14 in place. Plate 72 can comprise a flat plastic plate (or metal or other suitable material) of any suitable length, e.g. about 12 inches long, and any suitable width, e.g. about one inch wide, and about 3/16 inch thick. In some embodiments plate 72 can comprise pre-drilled threaded reinforced 3/16 inch (or other suitable size such as about ⅛, ¼, ½ or ¾ inch, etc.) diameter holes configured as built-in threaded nuts, such that nut 78 would be incorporated into plate 72 securing system 70 can in some aspects comprise a plastic screw (or metal or other suitable material) about ¾ inch long by about 3/16 inch in diameter (or other suitable size such as about ⅛, ¼, ½ or 1 inch long by about ⅛, ¼, ½, ¾ or 1 inch in diameter, etc.). Threaded portion 74 can pass through openings in attachment element 12, and alternatively in some embodiments through compression pad 14, and nut 78 can threadingly engage threaded portion 74 to join attachment element 12 and compression pad 14. In some aspects plate 72 can be sandwiched between compression pad 14 and nut 78 to provide a larger surface area against which nut 78 can compress compression pad 14 against attachment element 12. In some embodiments, the orientation of plate 72 and attachment element 12 can be reversed. In some embodiments, two plates 72 can be used to sandwich both pad 14 and attachment element 12. In embodiments in which a built-in threaded nut is incorporated into plate 72, the larger surface area provided by the plate is brought to compress upon the pad by tightening securing system 70 into the threaded nut of plate 72. In some embodiments one, two, three, four or more securing system 70 can be provided. In some aspects such a configuration can allow for a worn compression pad to be replaced or modified, or to be adjusted in length inward or outward to compensate for longer or shorter exterior or interior window sills.

Alternatively, in some aspects, and as shown for example in FIGS. 1B, 1C, 3A, 3B, 3C and 3D, compression pad 14 can be integrated with connection component 12 and/or item 16. That is, in some embodiments compression pad 14 can be integrated into, or be an integral component of, connection component 12 and/or item 16, as opposed to be joined by a joining element or fastener. By way of example and not limitation, compression pad 14 can be injection molded or otherwise formed along with connection component 12 and/or item 16, thereby forming a single unitary component. In some embodiments compression pad 14 can be permanently secured to connection component 12 and/or item 16, such as for example through the use of an adhesive or other bonding compound.

Figure 4:
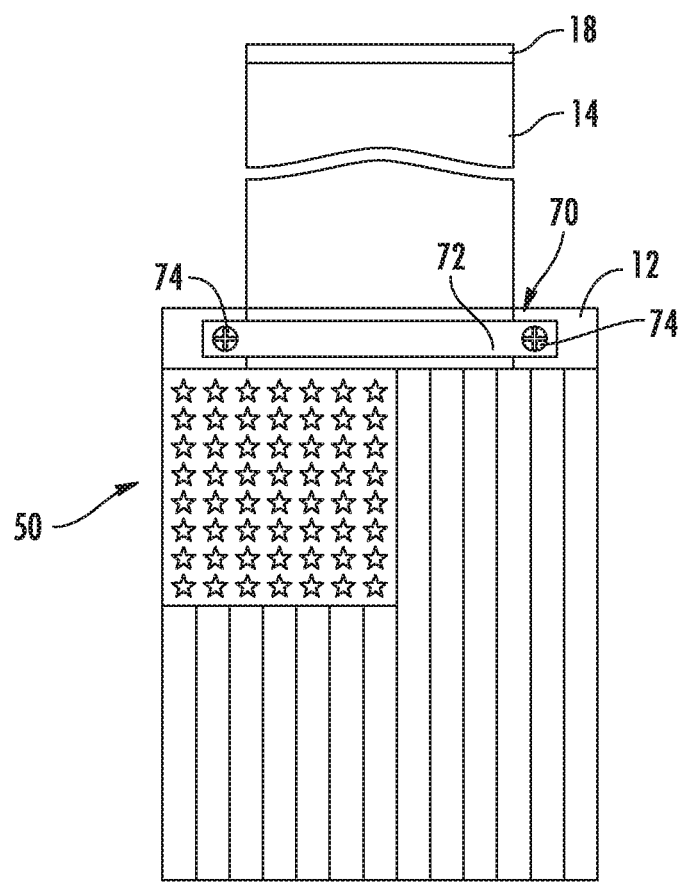
FIGS. 4, 5 and 6 are schematic illustrations of exemplary embodiments of window hanging devices as disclosed herein.
Figure 5:
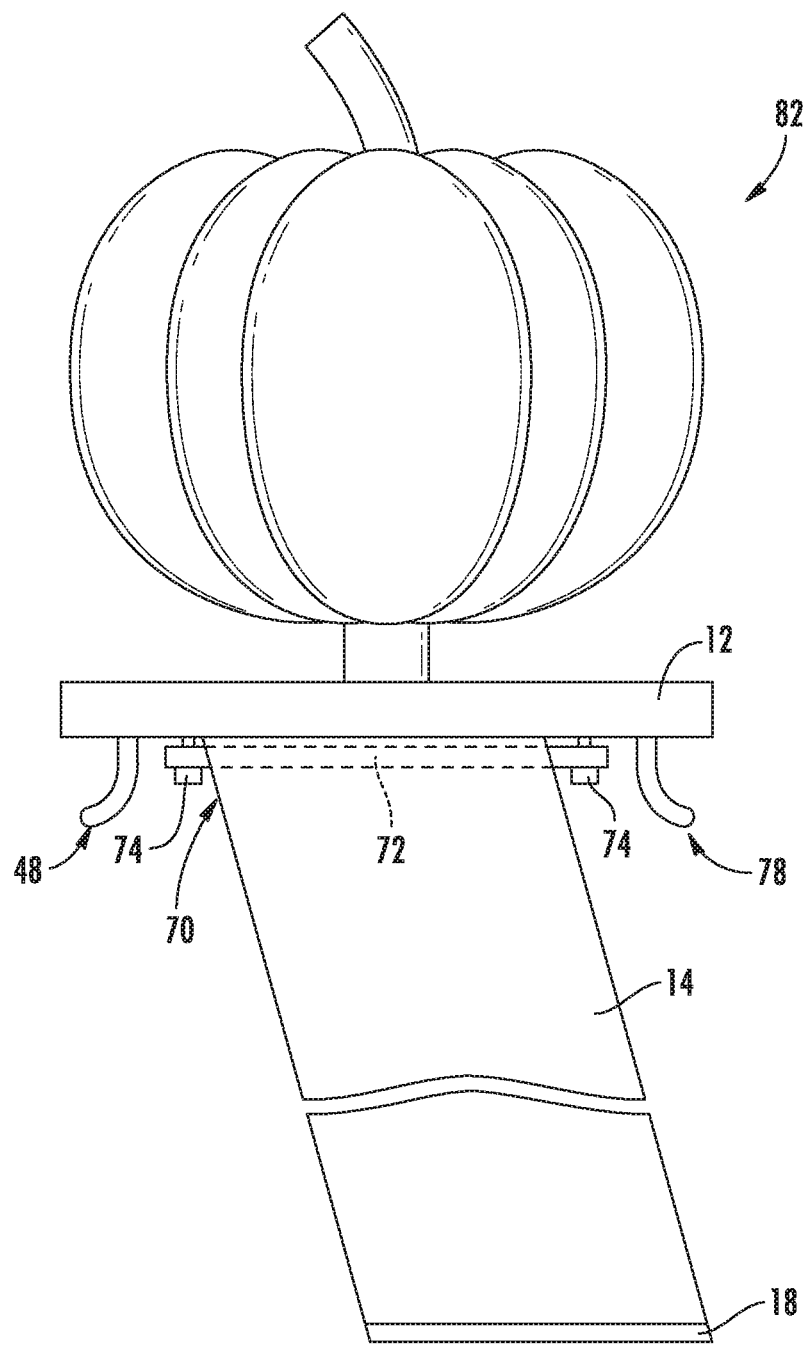
Figure 6:
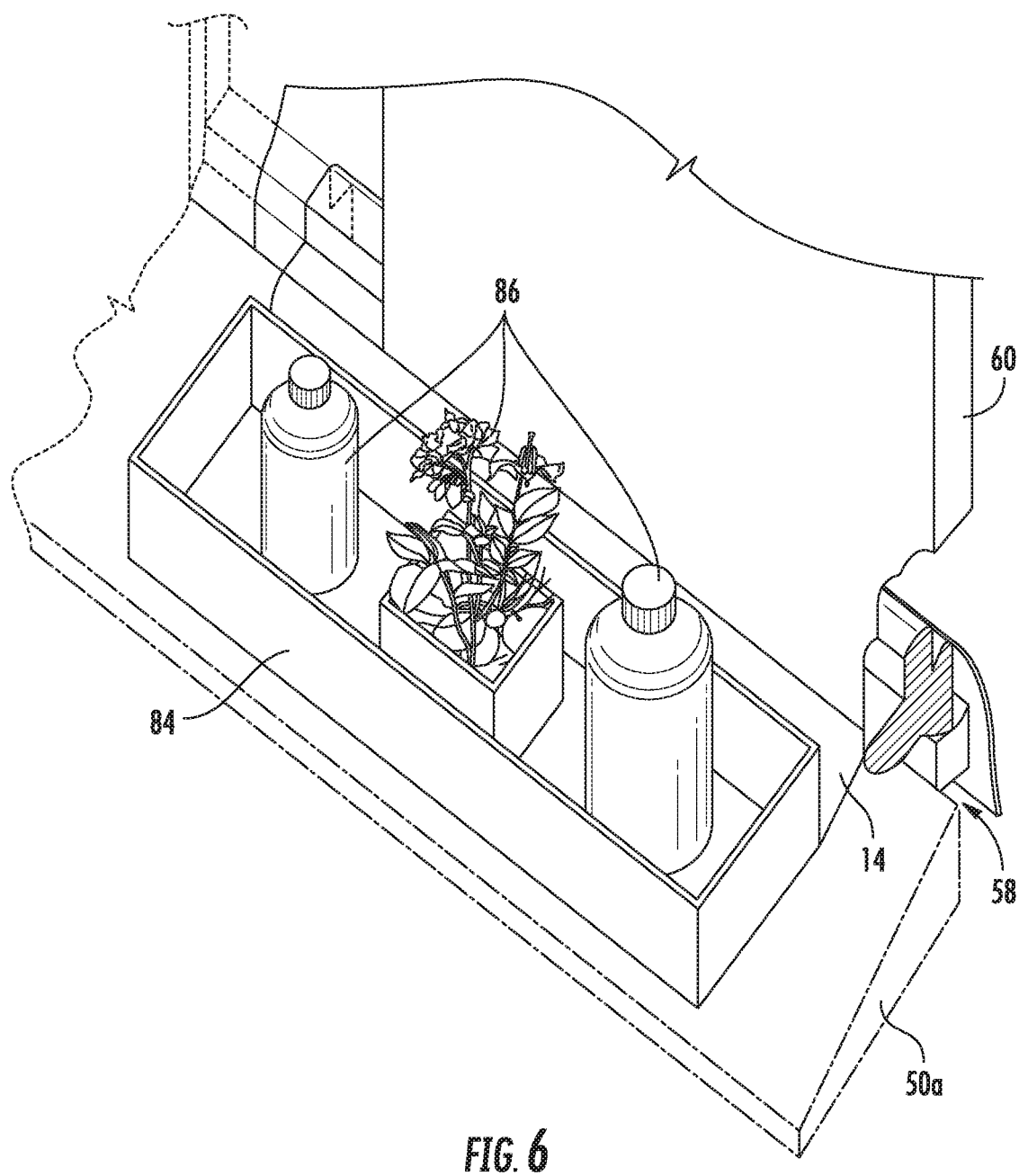

FIGS. 4, 5, 6 and 7A-7F are schematic illustrations of exemplary embodiments of the window hanging device 10 of FIGS. 1A-1C, 2A-2B and 3A-3E. Briefly, FIG. 4 illustrates a window hanging decorative item 50 configured to be secured in a lower window sill such that it can drape over an outer or inner window sill ledge and add aesthetic and decorative appeal to a structure, building or home. Similarly, FIG. 5 illustrates a window hanging decorative item 82 configured to be secured in a lower window sill such that it can rest on an inner or outer window sill ledge and add aesthetic and decorative appeal to a window of a structure, building or home. FIG. 6 illustrates a window hanging basket 84 configured to be secured in a lower window sill such that it can rest on an inner or outer window sill ledge and provide storage in a window casing. Finally, by way of further example and not limitation, FIGS. 7A through 7D and 7F illustrate a window hanging bird feeder 100 configured to be secured in a lower window sill such that it can rest on an outer window sill ledge and provide feed to wild birds in close proximity to a window for ease of viewing and enjoyment by occupants of a home or dwelling.

To elaborate, FIG. 4 illustrates a window hanging decorative item 50, such as for example a flag, configured to be secured in a lower window sill such that it can drape over an outer or inner window sill ledge and add aesthetic and decorative appeal to a structure, building or home. Window hanging decorative item 50 can comprise the decorative item secured to compression pad 14 by any suitable means, including for example using securing system 70, including one or two strip(s) 72 and threaded fasteners 74, as illustrated in FIG. 3E and discussed above. In some aspects an attachment component 12, as discussed hereinabove, can also be included. Alternatively, in some embodiments no attachment component 12 is used, and decorative item 50 and compression pad 14 are sandwiched between two strips 72. In some aspects, decorative item 50 can be affixed directly to compression pad 14 using any suitable means, including for example adhesive, rivets, screws, bolts, nuts, brads, etc. In an assembled condition, the compression pad 14 of window hanging decorative item 50 can be sandwiched between a window frame and window sill to secure the decorative item in place such that the decorate item, e.g. flag 50, can hang outside or inside a window over a window sill. Placement of compression pad 14 within the gap between the window frame and window sill can allow for a desired positioning or draping of the flag over the window sill ledge. Although depicted as a flag in FIG. 4, decorative item 50 can comprise any decorative or aesthetic item, or informational signage, desired to be displayed.

FIG. 5 also illustrates a window hanging decorative item 82, but in a different configuration than that of FIG. 4. Window hanging decorative item 82 can be configured to be secured in a lower window sill such that it can rest on an inner or outer window sill and add aesthetic and decorative appeal to a structure, building or home. Window hanging decorative item 82 can comprise the decorative item secured to compression pad 14 by any suitable means, including for example using an attachment component 12 secured to the compression pad 14 by way of securing system 70. As discussed in more detail hereinabove, securing system 70 can comprise strip 72 and threaded fasteners 74, as illustrated in FIG. 3E. In some embodiments, support elements 48, as shown in FIGS. 3B and 3D, (or support elements 38 as shown in FIGS. 3A and 3C) can be attached to attachment component 12 to provide a mechanism to level and support decorative item 82 on a window sill or against a structure if no sill is available. In an assembled condition, the compression pad 14 of window hanging decorative item 82 can be sandwiched between a window frame and window sill to secure the decorative item in place such that the decorative item, e.g. pumpkin 82, can hang outside or inside a window on a window sill. Placement of compression pad 14 within the gap between the window frame and window sill can allow for a desired positioning of the decorative item on the window sill ledge. Although depicted as a decorative pumpkin in FIG. 4, decorative item 82 can comprise any decorative or aesthetic item, e.g. holiday decoration, seasonal decoration, personalized decoration, etc., desired to be displayed.

FIG. 6 also illustrates a window hanging basket 84. Window hanging basket 84 can be configured to be secured in a lower window sill such that it can rest on an inner or outer window sill and provide storage or aesthetics. Window hanging basket 84 can comprise the basket secured to compression pad 14 by any suitable means, including for example using an attachment component secured to the compression pad 14 by any means disclosed herein, and/or by affixing the compression pad 14 directly to basket 84. In an assembled condition, the compression pad 14 of window hanging basket 84 can be sandwiched between a window frame and window sill to secure the basket in place such that the basket can rest inside a window on a window sill. Placement of compression pad 14 within the gap between the window frame and window sill can allow for a desired positioning of the basket on the window sill ledge. In some embodiments, support elements, as shown in FIGS. 3A through 3D, can be attached to a lower surface of basket 84 to provide a mechanism to level and support the basket on a window sill. Although depicted as a basket in FIG. 6, item 84 can comprise any container, box or holding structure of any shape, size or color desired.

Although FIGS. 4-7 illustrate example window hanging devices, many other applications of window hanging devices are within the scope of the instant disclosure. For example, in the context of bird feeders, bird baths and other animal feeders and shelters, the use of a compression pad on the item can allow a user to pull the feeder/bath/shelter inward as the window is closing, thereby mounting the feeder/bath/shelter very near or against the outer glass of the window. This is as close as a feeder/bath/shelter can possibly get without being inside the house or structure. With such a configuration, the birds and animals are only a few inches from the window glass. In such proximity the birds and/or animals can be readily seen, heard and otherwise observed.

In some embodiments, the compression pad can comprise a handle configured to allow a user to easily and securely grip the compression pad during placement of the feeder. In some embodiments, the handle can comprise a ring, oval, substantially circular or rectangular shaped structure attached to the end or embedded near the end of the compression pad, and configured to allow a user to grip the handle. In some embodiments the handle comprises a cylindrical structure, e.g. a dowel.

The compression pad window hanging devices and systems as disclosed herein can be employed with any number of other items desired to be hung from or secured through or to a window/window frame. One additional example is a bird bath. Similar to the bird feeder embodiment, the bird bath can comprise a basin for holding water and optionally one or more perches for birds to use while bathing in the water. The basin can have an integrated compression pad, such as illustrated in FIGS. 1 through 7, or can have an attachable/detachable/adjustable compression pad as described herein. The bird bath can optionally have one or more adjustable support elements to provide additional support for the bird bath and/or allow the bird bath to sit level on an exterior window sill ledge. Such supports would be attached to the bird bath in a manner to insure the water does not leak at the points of attachment. As with the other items and/or embodiments disclosed herein, the bird bath can be secured to the window sill by compressing the compression pad between the window (e.g. lower window sash of a single or double hung window) and the window jamb/sill. As with other embodiments, the bird bath can be attended to, i.e. refilled with water or cleaned, simply by opening the window.

Still yet, in some embodiments the compression pad window hanging devices and systems as disclosed herein can be employed with a bird house. The bird house can comprise a main housing, including for example sides, a bottom and a roof. The housing may also have an opening or hole to allow birds to enter and leave the house, a perch on the outside, and/or optionally a baby bird (fledgling) exit ladder on the inside front wall of the house.

Similar to the other embodiments, the bird house can have an integrated compression pad, or can have an attachable/detachable/adjustable compression pad. The bird house can optionally have one or more adjustable support elements to provide additional support for the bird house and/or allow the bird house to sit level on an exterior window sill ledge. As with the other items and/or embodiments disclosed herein, the bird house can be secured to the window sill by compressing the compression pad between the window and the window jamb/sill. As with other embodiments, the bird house can be attended to simply by opening the window.

In some embodiments the compression pad window hanging devices and systems as disclosed herein can be employed with a planter. The planter can comprise a basin or pot of any shape, size or configuration suitable for holding and growing plants, and that can be positioned on a window sill ledge (exterior or interior). The planter can be configured of a size sufficient to hold soil or other growing medium and provide an appropriate space for plants to grow. In some embodiments the planter can be substantially rectangular in shape and configured to fit the approximate dimensions of the window sill ledge.

Similar to the other embodiments, the planter can have an integrated compression pad, or can have an attachable/detachable/adjustable compression pad. The planter can optionally have one or more adjustable support elements to provide additional support for the planter and/or allow the planter to sit level on an exterior (or interior) window sill ledge. As with the other items and/or embodiments disclosed herein, the planter can be secured to the window sill by compressing the compression pad between the window and the window jamb/sill. As with other embodiments, the planter can be attended to simply by opening the window while holding onto the compression pad, assuming the planter is positioned on the exterior window sill ledge. If the planter is positioned on the interior window sill, it can be attended to (cleaned, refilled, etc.) in place, or by simply unlocking and opening the window and removing the planter and compression pad from the window.

In some embodiments, a planter may also include a trellis or other structure configured to support plants, particularly those that tend to climb, e.g. vines. The trellis can be an integral part of the planter or a feature that can be added to the planter or otherwise placed near the plants. For example, the trellis can extend vertically from one or more of the sides, e.g. a rear side, of the planter.

In some embodiments the compression pad window hanging devices and systems as disclosed herein can be employed with a decorative or ornamental component, as illustrated in FIGS. 4 and 5 and discussed herein, for example. Such decorations or ornaments can be seasonal or holiday themed, e.g. Christmas, Hanukkah, Halloween, etc. The ornament or decoration can be any size, shape or configuration, and made of any suitable decorative material, so long as it is appropriate for hanging from and/or positioning in the lower portion of a window.

In some embodiments the compression pad window hanging devices and systems as disclosed herein can be configured as a squirrel feeder. Such feeders can be configured to hold an ear of corn, for example, or other feed appropriate for squirrels.

Similar to the other embodiments, the squirrel feeder can have an integrated compression pad, such as illustrated in the numerous embodiments hereinabove, or can have an attachable/detachable/adjustable compression pad. The squirrel feeder can optionally have one or more adjustable support elements to provide additional support for the feeder and/or allow the feeder to sit level on an exterior window sill ledge. As with the other items and/or embodiments disclosed herein, the squirrel feeder can be secured to the window sill by compressing the compression pad between the window and the window jamb/sill. As with other embodiments, the squirrel feeder can be attended to simply by opening the window.

In some embodiments the squirrel feeders provided herein can be configured to be secured from a lower window portion by compressing the compression pad between the lower window sash and the lower jamb/sill. The squirrel feeder can comprise a mounting base or base structure configured to attach to a compression pad (using an integrated compression pad, or a plate and/or other attachment elements, both as discussed herein), and configured to secure or hold the feeder in place. In some embodiments the holder, mounting base or base structure can comprise a plate-like structure or block of material with one or more attachment points or pins for attaching or securing an ear of corn or other feed item for squirrels. In some embodiments the attachment points for the ear of corn can comprise one or more threaded members affixed to the base and configured to be adjustable such that ears of corn of varying sizes can be secured between two or more of the threaded members by adjusting the threaded members inward or outward. The threaded members can further comprise a pin and/or cupped portion to hold and secure the ends of the ears of corn such that the ear of corn does not become dislodged during feeding. Moreover, in such configurations the compression pad can extend from and/or be attached to a lower or bottom portion of the holder, mounting base or base structure.

In some embodiments the compression pad window hanging devices and systems as disclosed herein can be configured as a hummingbird feeder. Such feeders can be configured to hold a nectar, for example, or other feed appropriate for hummingbirds.

In some embodiments the hummingbird feeders provided herein can be configured to be secured from a lower window portion by compressing the compression pad between the lower window sash and the lower jamb/sill, similar to the above described bird feeders.

In some embodiments the hummingbird feeders can be held in the window by the compression pad, with adjustable support members or leveling feet configured to adjust the feeder to compensate for different sill heights and angles, and/or to support the hummingbird feeder against the structure/building for windows with no sills. In some embodiments, the feet can comprise rubber or similar material with wire inside or other flexible/bendable material and will be bendable but strong enough to hold once they are bent into the correct position. The feeder can be provided in a plurality of sizes of bendable feet, e.g. two or more, in the event a given size does not work with a sill arrangement at a given house or structure. The compression pad can in some aspects comprise a handle configured to allow a user to easily and securely grip the compression pad during placement of the feeder.

In some embodiments, the hummingbird feeders can have adjustable support members such as, for example, those depicted in FIGS. 3A through 3D, and discussed hereinabove with respect to other window hanging devices. Such adjustable support members can comprise, in some embodiments, a bolt, screw, or other threaded or adjustable/bendable member that can be configured to have an adjustable height/length.

In some embodiments, the window hanging device or system as disclosed herein can comprise a bird feeder comprising a block of compressed bird seed and a compression pad attached to and extending from the block of compressed bird seed, wherein the bird feeder is configured to rest on an exterior window sill ledge on the outside of a window, wherein the compression pad is configured to be compressed between a closed window and a window sill to thereby secure the bird feeder in place on the exterior window sill ledge. Such a feeder could in some embodiments also comprise a base to which the block of compressed bird seed is affixed, wherein the compression pad is attached to and extends from a rear portion of the base in a substantially planar direction. In some aspects, such a feeder can also comprise one or more securing elements configured to secure the block of compressed bird seed to the base, wherein the securing elements extend from the base and into or around the block of compressed bird seed. The compression pad can comprise a sheet of material sufficiently flexible to be sandwiched between a closed window and a window sill yet sufficiently strong to securely hold the bird feeder in place. The compression pad can comprise a material selected from marine cloth, marine vinyl, silicone, plastic, leather, fabric mesh or similar netting, yarn, twine, malleable metal, rubber, oil cloth, a pliable material and combinations thereof. In some aspects, such a feeder can also comprise one or more adjustable support members extending from a bottom of the base, wherein the one or more adjustable support members are configured to support the feeder on an exterior window sill ledge and compensate for a downward slope of the exterior window sill ledge or to support the feeder against the structure if there is no sill. Such a feeder can be configured to be disposable or reusable once the bird seed is consumed.

Similar to the other embodiments, a window hanging device or system as disclosed herein can comprise security or monitoring equipment. For example, a security camera, monitoring device or sensor can comprise an integrated compression pad, or can have an attachable/detachable/adjustable compression pad, such that it can be suspended from a window of a home, dwelling, building or structure to provide security and monitoring of the same. Such a security device configured to hang from a window sill can optionally have one or more adjustable support elements to provide additional support for the security device and/or allow the security device to sit level on an exterior (or interior) window sill ledge. As with the other items and/or embodiments disclosed herein, the security device can be secured to the window sill by compressing the compression pad between the window and the window jamb/sill. As with other embodiments, the security device can be attended to (e.g. battery changes) simply by opening the window while holding onto the compression pad, assuming the security device is positioned on the exterior window sill ledge. If the security device is positioned on the interior window sill, it can be attended to in place, or by simply unlocking and opening the window and removing the security device and compression pad from the window.

In other embodiments, the window hanging devices disclosed herein can comprise bird feeders. Provided herein are window bird feeders configured to be secured in and through a window frame and rest on an outside window sill. In some embodiments the bird feeders provided herein can be made of plastic or other suitable material as disclosed herein, have a basin, and a permanent or removable cover/roof extending upward from the basin and attached to the basin at the two narrow ends. The basin can be configured to be filled with bird seed from inside the house. To eat, birds can land upon the upper edges of the basin, or they may sit inside the basin itself. A compression pad made of marine vinyl, marine cloth, silicone, or other suitable material as disclosed herein, can be affixed in a horizontal position flat against the bottom of the basin. The outer portion of the basin can in some embodiments be supported by one or more adjustable support members to accommodate the outer slope of various outside window sills or to accommodate the absence of a sill in order to insure that the basin sits in a level position and provide further support to the outer portion of the basin. The stationary compression pad can be configured to hold the feeder in the window by closing the lower sash onto the compression pad (which sits in the bottom track of the window), such that by the window compressing down upon the pad and then being locked, the feeder is secured into place in the window. The basin sits outside the window resting on the outer sill, with only the inner portion of the compression pad extending into the house or structure. To fill the feeder, one need only to hold onto the portion of the compression pad that is sitting on the inner window sill or the handle on the end of the compression pad that rests inside the house, unlock and open the window, and pour bird feed into the basin. Then, while still holding onto the inside portion of the compression pad, the window is lowered onto the pad and locked in place. Because the feeder sits directly against the outside of the window, it allows for maximum enjoyment of all facets of the art of bird watching.

In some embodiments, one or more support members can be integrated into the devices and systems and can comprise a fixed member on a surface, e.g. lower or bottom surface, of the device that provides support and/or leveling of the device on a window sill, or against the structure if no window sill is available. Such an integrated support can be, for example, molded as a single piece along with the basin.

The presently disclosed bird feeder designs overcome problems and challenges not addressed by current designs. For example feeders that do not mount to or near a window do not allow for "up-close" viewing of birds while they eat. Feeders not configured to mount to a window can in some instances be limited in mounting locations close to windows, particularly for upper floors. If the feeder is a distance from the window it can also be difficult to hear the birds singing from a distance. In addition, such feeders make it difficult or impossible to view and appreciate the anatomical and behavioral nuances, coloration and beauty, feather configurations, body-shape variations and other anatomical features of each different bird species. The disclosed bird feeder design is configured to mount in a window frame and therefore allows for the viewing of birds up-close and from inside the house.

Additionally, the use of a compression pad on the bird feeder can allow a user to pull the feeder inward as the window is closing, thereby mounting the feeder very near or against the outer glass of the window. This is as close as a feeder can possibly get without being inside the house or structure. With such a configuration the birds are only a few inches from the window glass. In such proximity the birds can be heard singing with the only small impediment to hearing at full volume being the glass of the window. Moreover, all of the additional anatomical features discussed above can be readily seen and enjoyed when the birds are this close to the clear window as fostered through use of the instant configuration.

A problem with feeders designed with suction cups to be mounted on glass is that the suction cups may release from the window causing the feeder to fall and become damaged, or to cause injury to passersby. This problem is compounded for those living on the second or higher floors of a building. This problem is solved by the presently disclosed feeder since no suction cups are needed. Instead, the feeder is held in place by the closing of the window onto the compression pad and then locking the window latch. Thus, the feeder is held securely in place by the locked window.

Current feeder designs, including those configured to attach to a window via suction cups, can be difficult to easily and safely install. For suction cup feeders, when there is no access or difficult access from outside (e.g., upper story of building, inclement weather, etc.) and one wishes to install a suction cup feeder on the upper sash of a double hung window, one has to open the upper sash, lean out the opening, place his or her body weight against the window and contort his or her body to be able to apply inward pressure against the upper glass to get the suction cups to adhere. Installing in this awkward position creates a risk of falling by leaning too far, or by the window giving way under the installer's body weight. Lastly, there is the risk of injury (especially if older windows) by pushing too hard on the glass to affix the suction cups and thereby breaking the glass.

Moreover, it can be difficult to install suction cup feeders to the lower sash from inside the house because the window can only be opened a few inches since there has to be enough space on the outside of the lower window sash for the feeder to sit on it without it hitting the upper (i.e. outer) sash when the window is pushed upward to open. This leaves very little space at the bottom of the open window for the installer to lean out and contort his or her body to apply sufficient inward pressure against the glass so the cups adhere.

If installing on the upper or lower sash by using a ladder outside, there is a risk of dropping the feeder and/or a risk of falling from the ladder by losing balance when pushing against the window to attach the suction cups. Also, installation in the winter months may be difficult or impossible due to inclement weather.

The above problems are even more of a concern for those with limited mobility, such as the elderly, infirm or handicapped.

Ease of installation, and secure installation, are also problems with tension feeders and in-house feeders. Tension feeders are designed to be held in place by tension rods spanning the outside window frame. However, such feeders tend to be large, heavy and unwieldy. Some are made of wood, metal and plastic, and weigh several pounds. With such designs there is a risk of dropping it out the window onto whatever is below, including passersby, while trying to maneuver the unit into place, and trying to hold onto it while adjusting the tension rods to fit the window frame. The risks of dropping such a unit while using a ladder are greater due to the bulkiness, weight and unwieldy nature of these feeders. Those with limited mobility or strength will also find such feeders very difficult to install.

So called in-house feeders have a vertical panel configured to sit in the window track directly under the window. The panel extends the entire width of the window, and is attached perpendicularly to the feed basin. The feeder is held in place by closing the window down upon the top of the panel. The remainder of the unit (feed basin) extends into the house or structure. Such a configuration presents its own challenges of installation, including risk of dropping the unit out the window and safely securing the unit in an unlocked window. These installation challenges and safety risks are overcome by the present bird feeder design. Particularly, the presently disclosed bird feeder design can be installed quickly, easily and safely in any type of weather and at any level of the building by simply opening the window, setting the feeder on the exterior window ledge, closing the window onto the compression pad and then locking the window. All this is done while standing safely on the floor inside the house or structure. While the window is being opened, the unit is maintained safely in place by the user holding onto the pad which sits on the interior window sill. Since the unit is lightweight and supported on the outside window ledge by the leveling screws/adjustable support members, the pad can be held in place with minimal effort, making it simple for even those with infirmities to do so.

Safely maintaining suction cup and tension feeders can also be a challenge. For suction cup feeders the same difficulties applicable to upper or lower sash installation discussed above apply to the maintenance of such feeders. Most suction cup feeders need to be detached from the window to remove stale or wet food, or uneaten shells, requiring climbing a ladder or leaning out the window and applying pressure outward to remove the suction cups. This leads to a risk of falling or dropping the unit. The feeder also needs to be removed to wash it with the same risks. It then needs to be reinstalled with the same risks mentioned above. Finally, the same issues and risks come into play when the feeder is to be refilled with bird feed/seed.

In winter months to clean, wash, refill or otherwise maintain first floor suction cup feeders requires either leaning out the window as discussed above, or going outside and possibly using a ladder (depending upon height of feeder) in potentially slippery or otherwise uncomfortable conditions. For those with limited mobility, this may be an impossible task.

Owners of tension feeders need to be careful to avoid applying pressure on the unit while removing unwanted seed because they could dislodge the tension rods causing the feeder to fall onto passersby or whatever is below. This could also break the unit. To clean it out thoroughly may require complete removal, with the same risks of falling or dropping the unit as discussed above.

The presently disclosed feeder designs solve these maintenance issues. The disclosed feeders are lightweight and easily cleaned by holding onto the compression pad, opening the window, and bringing the feeder inside to dump the seed or clean the unit from the safety and comfort of one's home. While the window is being opened, the unit is maintained safely in place by the user simply holding onto the compression pad which sits on the interior window sill.

Moreover, the presently disclosed feeder design facilitates easy filling/re-filling with bird seed/feed. The disclosed feeder can be easily filled by holding onto the compression pad, opening the window, and pouring seed into it while it is still in place in the window. This overcomes those issues of safety and discomfort discussed above. There is very limited risk to the user in installing, filling or maintaining the disclosed feeders. Additionally, the large opening between the top of the basin and the bottom of the elliptical or peaked cover of the disclosed feeder design allows for easy access to the feeder basin while the feeder is installed. Moreover, the large-capacity basin reduces the need for frequent refills.

There also exists a problem with the security of the attachment of suction cup feeders and tension feeders. Both of these feeder designs suffer from potentially insecure attachments with the risk of falling units. For example, suction cup feeders can come loose and fall when the suction releases, when heavy birds use them, or when birds competing for feeding position dislodge them, or when squirrels jump onto them. Moreover, in hot, cold or wet weather, suction cup feeders are more difficult to affix and keep in place due to the effects of the heat or cold (or moisture from dew or rain) on the window and on the suction cups. For example, the rubber cups become more brittle in cold weather or weatherworn over time. Likewise, for tension feeders there is no stop mechanism on the sides of the window frame under the ends of the tension rods for the ends of the tension rods to sit in. Thus, the tension feeders can slide down causing instability in the feeder and a risk of falling. This is most pronounced with the tension feeders of heavy construction.

This concern with instability and insecurity of attachment is overcome by the present design. The compression and locking of the window down upon the compression pad holds the lightweight feeder securely against the window, thereby obviating risk of falling. Moreover, the disclosed feeder is further supported and stabilized by the two adjustable leveling screws/support members, which allow one to adjust the height of the outer part of the feeder so it sits level and directly on the outer part of the window ledge. This allows it to be adjusted to match the slope of various exterior ledges. Once adjusted, this design provides support to the outer portion of the feeder, thereby further stabilizing the entire unit.

Another problem encountered by existing bird feeders is that many larger birds cannot use them due to size constraints. For example, most suction cup feeders are rather small and have a small seed reservoir, due to the inability of the suction cups to hold heavy weight, which limits the ability of larger birds, e.g., morning doves, woodpeckers, blue jays, or similar larger species, to utilize them. Moreover, suction cup feeders can become dislodged by the weight and actions of larger birds in struggling to maintain stability or jockeying for position while attempting to eat. Likewise, many of the tension feeders and in-house feeders have a small bird entrance hole, which also limits access for larger birds. Or, if larger birds are able to gain access, the small hole makes it more difficult for them to exit which could lead them to struggle and become injured.

In contrast, the presently disclosed bird feeder designs include an oversized basin for holding the seed/bird feed, with an arched or peaked roof structure configured at a height above the oversized basin to provide a generous opening through which larger birds can access the seed/bird feed and comfortably utilize the feeder. In the embodiment with the non-permanent cover, use with the cover removed leaves the basin wide open permitting full access to the seed/bird feed. In both embodiments, with and without the cover, larger birds can easily perch on the edge of the basin or can sit inside the basin while eating. Another advantage of the oversized basin is the ability to use any type of loose seed. This is in contrast to some feeders with small openings that limit the size and type of bird seed/feed. Because of its large, open basin, the presently disclosed feeder even allows for use of cylindrical or rectangular-shaped suet or other compressed feed blocks, or square suet or other compressed feed blocks which are easily cut to fit into the basin. The most efficient use of compressed feed blocks for the feeder would be through the embodiment which includes a compressed block that will be provided with the basin in the exact, or substantially similar, length, width and/or height dimensions of the inside of the basin. Thus, no space is wasted since the entire length and width of the basin is filled with this single solid block of compressed seed. The large, open basin also permits use of any other type of food which birds will eat, such as pieces of fruit, peanuts, etc. which most feeders cannot accommodate. As such, the foregoing allows the user to choose the species of birds that he or she wishes to view by utilizing the type of feed that each particular species prefers and to change same at will, thereby permitting complete variety and flexibility in his or her bird watching activities. In some embodiments the large open design of the basin also permits the user to fill it with water for use as a bird bath or with nesting material, either loose or inside a box or other container, for use as a bird house.

Another problem with existing bird feeder designs is excessive waste/spillage of seed/bird feed. For example, suction cup feeders typically have a shallow seed reservoir. Thus, seed is displaced by the birds' normal feeding behaviors. This seed spills onto the ground and is wasted. Vertical cylinder type feeders utilize multiple small perches and feeding ports. The effects of gravity coupled with the birds' normal feeding behaviors results in unnecessary spillage of seed. In addition to wasting seed/bird feed, the spilled seed/bird feed creates an unsightly mess necessitating clean up, and if not cleaned up can attract rats, mice, skunks, raccoons and other nuisance animals.

This problem is significantly reduced by the disclosed bird feeder designs by providing a deep basin which catches and holds the bulk of the seed that is naturally displaced when the birds eat. In the embodiments including the single compressed block of seed that fits inside the basin, spillage is even less than with loose seed.

Another problem with currently existing tension feeders and in-house feeders is their large, heavy, and obtrusive size. The design of these feeders can make them unwieldy and obtrusive in a window opening, obstructing both the view of the birds and the yard beyond. These designs also increase the cost and complexity of use. Such issues are not present in the disclosed bird feeder designs since they can in some embodiments be constructed of a plastic material or other suitable material that allows a full, unobstructed view of the birds and the entire feeding process. Moreover, the feeder designs provided herein are configured to be secured in a window such that they sit at the very bottom of the window on the ledge beneath the lower window frame, which gives the user a nearly full view outside the window. Another concern with existing suction cup feeders is their limited seed/bird feed capacity. Since the suction cups can have a limited load capacity the size of the feed container/basin is often times limited so as to not exceed the load capacity of the suction cups. The presently disclosed feeder designs overcome this by providing two forms of support, one comprising the window locking down upon the compression pad, and the second including the adjustable support members resting upon the outer window sill. Such a design allows for a significantly larger feed basin, thereby avoiding frequent refills.

Another problem encountered by current feeder designs is that many, including typical hanging bird feeders and basin feeders, leave the seed/bird feed unprotected from the elements. In such cases the seed/bird feed can become wet from the elements causing moldy seed/bird feed, and potentially causing avian illness. The presently disclosed design provides in some embodiments a cover or roof structure while also provided adequate access from the front and back. The cover affords some protection from the elements, particularly as compared to an open basin feeder. Since the cover adjoins the short edges of the basin it can also prevent rain or snow from entering on either side. Moreover, since the bird feeder is configured to be mounted in a window sill and near or completely against the window glass, some additional protection is provided from both the window overhang and the roof eaves, even in embodiments where the cover is not used.

Finally, in-house feeders are difficult to secure in windows, are unstable, allow cold air to come into the house, and present a security risk. In-house feeders are configured with a vertical panel which sits in the window track directly under the window, and extends the entire width of the window. This panel is attached perpendicularly to the feed basin and lies in a horizontal position. The feeder is held in place by closing the window down upon the top of the vertical panel. The remainder of the unit (feed basin) extends into the house. Because the unit is heavy and bulky and since the window cannot be locked, the feeder is not entirely secure. Due to the weight of the feeder and its tendency to lean inward since it does not rest upon the inside window ledge, the window could easily work its way open. Also, the contact between the window and the in-house feeder is not air-tight. This leads to inefficiency in heating and cooling the home or structure. It also leads to discomfort for those sitting or standing near the window because cold air (or warm air in summer) continually blows in through the numerous unsealed areas between the top of the panel and the bottom of the lower window and the sides of the panel and the window frame. The effort of some feeders to overcome this shortcoming by including foam rubber weather stripping like that used for window air conditioners is wholly insufficient. The presence of these unsealed, open areas also permits undesirable crawling and flying insects such as spiders, centipedes, mosquitoes, and flies to enter the house.

And finally, when an in-house feeder is in place the window cannot be closed or locked. This creates a security risk and makes it difficult and in most cases impossible to engage the home or facility's security system. It also creates the potential for allowing undesirable seed-seeking vermin, squirrels, mice, etc. to encroach into the users' living space either inside the in-house viewing area or through the unlocked window should it open.

The presently disclosed feeder designs overcome all of these challenges since this feeder is held in place by locking the window in a fully closed position. Thus, a window with the feeder is just as secure and airtight as the window is without the feeder. Moreover, since the window is locked tight, the home or facility's security system may be fully engaged in most instances. This also allows the feeder to be used in any weather conditions, since it does not introduce inefficiency in heating/cooling or discomfort from cold or warm outside air entering the house. Thus, it can be used year round.

At least one embodiment of a bird feeder disclosed herein is depicted in FIGS. 7A through 7D. The feeder 100 of FIG. 7A can comprise a basin 102 with attached (permanent or removable) cover 106. A compression pad 104 can also be provided and attached to a lower surface 120 of basin 102. Moreover, in some embodiments one or more adjustable support members 108 can be provided.

Figure 7A:
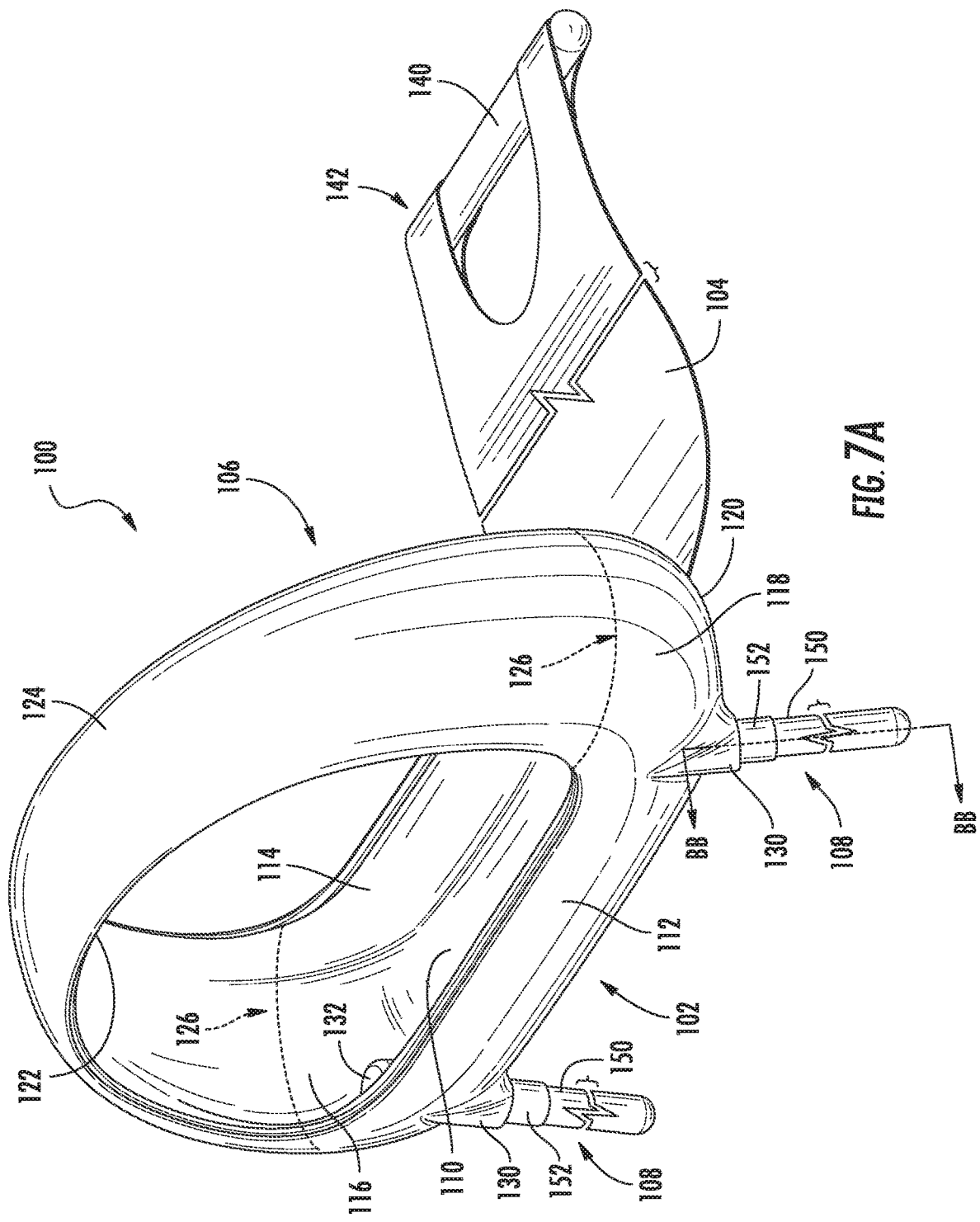

Continuing with FIG. 7A, basin 102 can comprise a generally rectangular or oval structure with a bottom 110 and generally four sides, including a first opposing long side 112 and second opposing long side 114, and a first opposing short side 116 and second opposing short side 1a (also referred to as front 112, rear 114, left 116, and right 118 sides). As depicted in FIG. 7A, basin 102 can comprise a substantially oval-like structure, or substantially rectangular structure with curved edges adjoining opposing long sides 112/114 and opposing short sides 116/118. As such, basin 102 can be configured to create a trough-like structure to hold bird seed or bird feed in the interior space created by the bottom 110 and four sides 112, 114, 116, and 118.

Compression pad 104 can be attached horizontally to a lower surface 120 of basin 102 and extend in a planar direction from opposing long side 114 of basin 112. In some embodiments a weight 140 can be affixed to a terminal end 142 (distal from the basin 102) of compression pad 104. Cover 106, either integrated into or affixed to first opposing short side 116 and second opposing short side 118, can extend above basin 102 in a generally arched, curved or peaked roof-like structure, or in some embodiments a domed structure, to create a cover over basin 102 while remaining open on the front and rear portions, or first opposing long side 122 and second opposing long side 124, of cover 106. As depicted in FIG. 7A, in some embodiments one or more adjustable support members 108 can be integrated into bottom 120 of basin 102.

Cover 106 as illustrated in FIG. 7A extends from and is either integrated into basin 112 or attached to basin 112 at joint 126. Cover 106 can in some embodiments be configured to extend above basin 112 to provide shelter to the interior of basin 112 and protect the contents thereof from weather and environmental elements while simultaneously allowing access to basin 112 from the front and/or rear of basin 112. The rear vertical plane of cover 106 is at least flush with or slightly set forward of the rear plane of basin 102 such that cover 106 does not interfere with or otherwise prevent the mounting of basin 102 flush against a window in an installed position. Although illustrated in curved or domed roof-like configuration in FIG. 7A, cover 106 can be shaped or configured in any number of ways without departing from the scope of the instant disclosure, such as for example a peaked or gabled roof-like shape. In some embodiments cover 106 can provide additional protection from squirrels. When designed with a smooth or slippery surface, e.g. plastic material, the sloped or elliptical shape of the top can make it harder for squirrels to latch onto the feeder. Additionally, because the outer edges of cover 106 are attached directly to the outer edges of basin 102, the squirrels cannot enter the feeder from the sides.

Feeder 100 is configured to be installed in a window frame just as item 10 with compression pad 14 is installed as shown in FIG. 1A. Feeder 100 can secured by compression pad 104 being sandwiched (or otherwise secured) between a window frame, e.g. the frame of the lower sash of a single or double hung window, and a window sill when window the frame is in a closed position. The interface between the window frame and the window sill provides sufficient space for compression pad 104 even when the window is in a fully closed and locked position. This orientation of compression pad 104 in the closed window secures feeder 100 on the outside of the window and prevents it from falling. Feeder 100 can, in some embodiments, be further supported by resting on window sill 58 as depicted in FIGS. 3C and 3D using item 10. Adjustable support members 108 can in some embodiments provide support and compensate for any slope or angle in exterior window sill ledge 50 (FIG. 1A) as it extends away from the window or provide support from the structure for windows with no sill, thereby allowing the feeder to be leveled or placed in a substantially level position.

It will be appreciated that windows, window frames and window sills come in many configurations and designs. The bird feeder designs provided herein are configured to work in any number of window designs provided that at least a portion of a window or window frame can be opened sufficiently to place the compression pad in the opening and then close the window to secure the bird feeder.

As depicted in FIG. 7A, in some embodiments one or more adjustable support members 108 can be integrated into bottom 120 of basin 102. In some embodiments, these support members can be configured similar to the adjustable support members 38 in FIG. 3A and adjustable in height by screwing them into or unscrewing them out of the bottom of basin 120. In some embodiments, adjustable support members 108 can be configured similar to adjustable support members 48, or bendable feet, in FIGS. 3B and 3D. Thus, in some aspects adjustable support members 108 can comprise a rubber or similar material with, in some embodiments, a wire or strip of resilient material inside. In some aspects, support members 108 can be made of any flexible/bendable material, such that support member 108 can be bendable and/or malleable yet strong enough to hold once bent into a desired or correct position. Such flexibility of support members 108 can allow them to be positioned in any suitable manner sufficient to compensate for a sill slope or absence of a sill, yet still support the weight of the feeder or other hanging device.

Support members 108 can comprise a bendable portion 150 of a variable or desirable length terminating at a distal end with an opposing proximal end comprising a connector 152. In some aspects, connector 152 of support member 108 can comprise a rigid or substantially rigid material while bendable portion 150 extends therefrom. As shown in FIG. 7E (a cross-sectional view of support member 108 at cross section BB in FIG. 7A), connector 152 of support member 108 can be configured to mate with or be received in a socket 130 on basin 102. Socket 130 can be integrated in or otherwise attached to basin 102 and configured as a cylindrical (or other appropriate shape) cavity having a diameter or width the same as or similar to connector 152 such that connector 152 can securely engage socket 130. Connector 152 can, for example, slidingly or threadingly engage socket 130 to securely attach support member 108 to basin 102. Connector 152 and socket 130 can comprise matching threaded portions to facilitate a threaded mechanical engagement that securely couples connector 152 to socket 130 but also allows for removal of support member 108. Alternatively, connector 152 can be configured to snap fit or tension fit into socket 130 by slidingly engaging connector 152 into socket 130.

Referring to FIG. 7D, support members 108 can comprise any flexible/bendable material, such that support member 108 can be bendable and/or malleable to conform to a desired or needed length, shape and/or position. In some aspects, although adjustable or bendable such feet are also sufficiently rigid or resilient that they retain their shape and/or position to support the feeder in a desired or correct position. Such flexibility of support members 108 can allow them to be positioned in any suitable manner sufficient to compensate for a sill slope or absence of a sill, yet still support the weight of the feeder or other hanging device. By way of example and not limitation, support members 108 can be bend in any direction d and can have a desired length as shown by the broken line. Also shown in FIG. 7D, support members 108, or bendable feet, can be rotated around rotatable axis r to position them as desired or needed.

A plurality of sizes of support members 108, or bendable feet, e.g. two or more, can be provided in a kit in the event a given size does not work with a sill arrangement at a given house or structure. In some embodiments the various sizes of feet can be interchangeable such that a user can select the most appropriate size for a given application. Such feet, or support members 108, can be about one inch long, about 2 inches long, about 2.5 inches long, about 3 inches long, about 3.5 inches long, about 4 inches long or about 5 inches long or longer, and about ¼ inch, about ½ inch, about ¾ inch or about one inch or more in diameter.

Adjustable support member 108 can be adjusted or positioned so as to compensate for the slope or change in elevation of exterior window sill ledge 50 as it slopes away from the window, as shown in FIGS. 3C and 3D, so that feeder 100 can be supported on exterior window sill ledge 50 in a level or substantially level position. In some embodiments feeder 100 can comprise one, two, three, four or more adjustable support members 108, as needed to adequately support and/or level feeder 100. In some embodiments the one or more adjustable support members 108 can be positioned at any suitable location on feeder 100. The adjustability of adjustable support members 108 allows for the use of window hanging feeder 100 in any number of window and window sill configurations where the slope/angle of the window sill may vary.

In some embodiments one or more adjustable support members can be included in the feeders herein to support the feeder where no window sill is available. In such embodiments the adjustable support members can comprise a flexible or bendable component capable of being positioned to support the feeder against a structure, e.g. an outer (or inner) wall, where no window sill is available. Such bendable support members can support and position the item outside (or inside) the window to which it is secured via the compression pad.

Figure 7B:
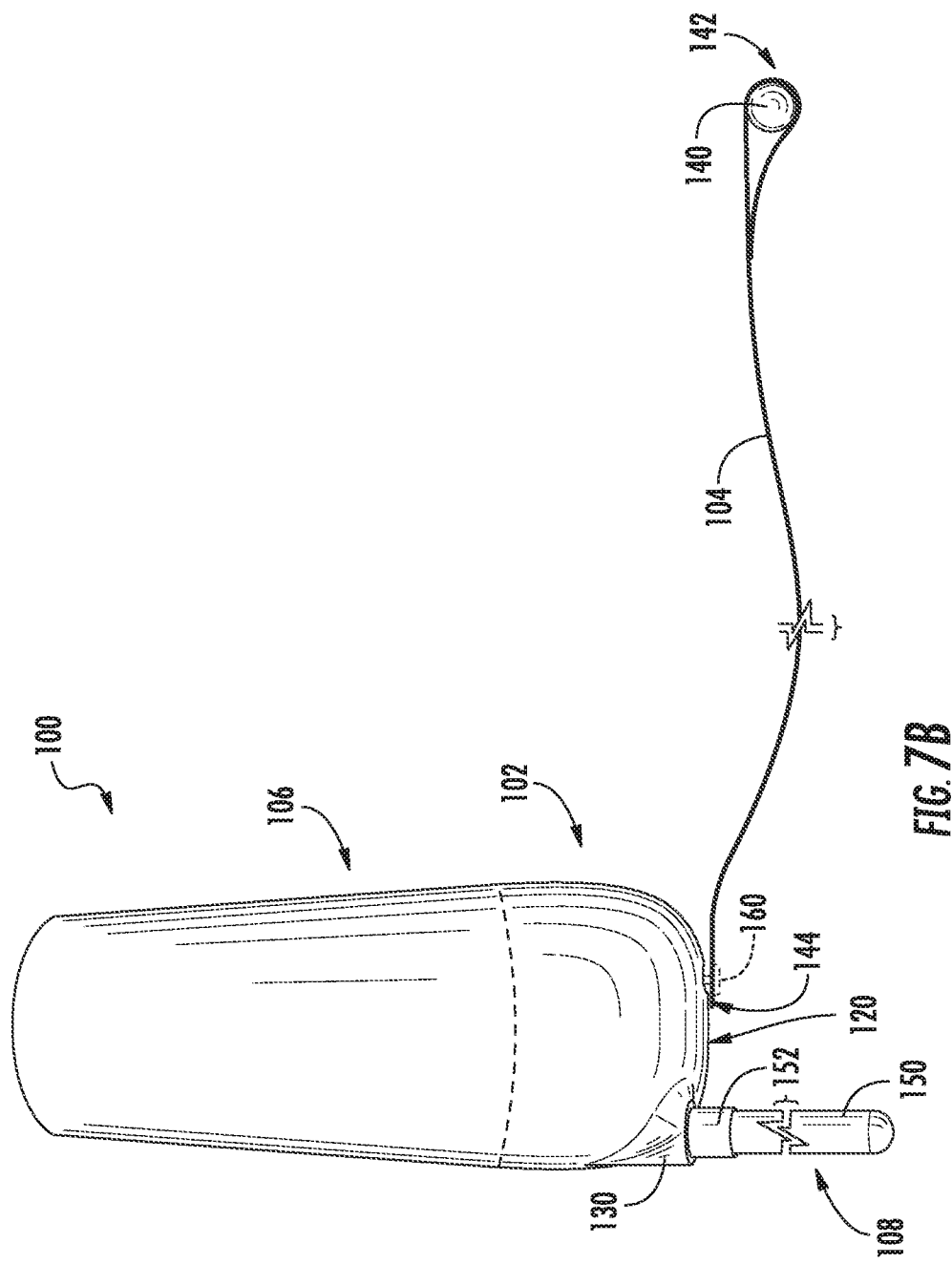
Figure 7C:
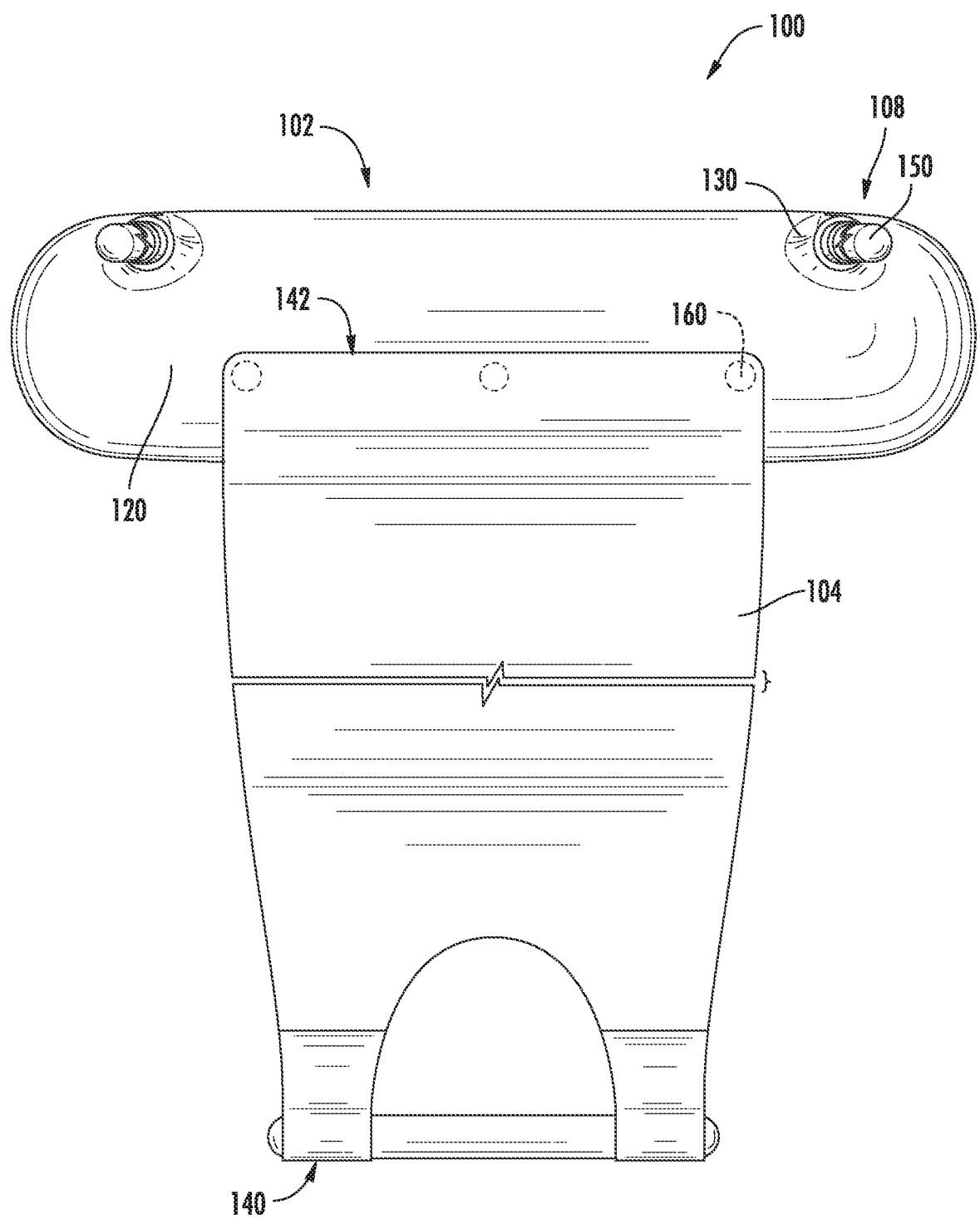
Figure 7E:
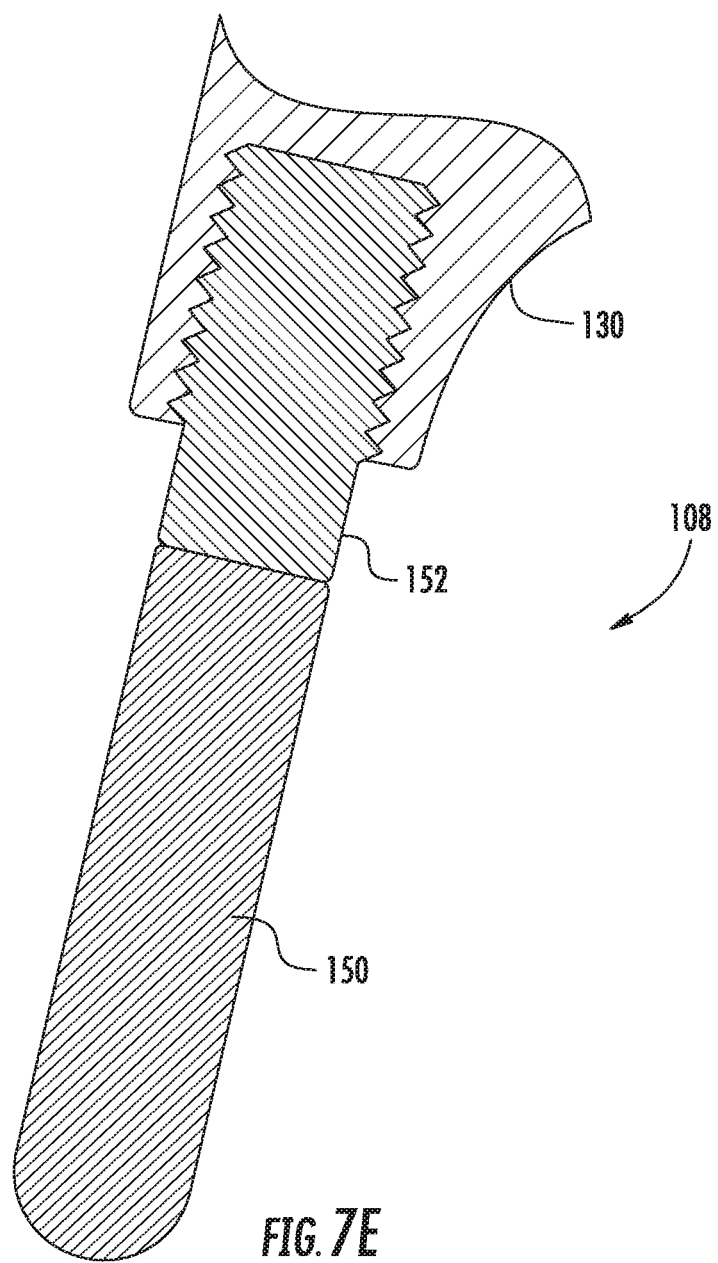
FIG. 7E is a cross-sectional view of a support member of the window hanging device configured as a bird feeder of FIG. 7A.

Referring to FIGS. 7B and 7C, side and bottom views, respectively, of feeder 100, compression pad 104 is shown attached to bottom 120 of basin 102. Compression pad 104 can be attached horizontally to a lower surface 120 of basin 102 and extend in a planar direction from opposing long side 114 of basin 112. Compression pad 104 can be attached or otherwise secured to a bottom 120 of basin 102 at a proximal end 144 of compression pad 104, or in some embodiments a rear portion of basin 102, using any appropriate securing element, including for example attachment elements 160. Attachment elements 160 can comprise bolts, screws, rivets, brads or the like sufficient to secure compression pad 104 to basin 102. Attachment elements 160 can pass through aligned holes in compression pad 104 and basin 102, or can be integrated into bottom portion 120 of basin 102 such that only holes in compression pad 104 are necessary.

In some aspects, compression pad 104 can be integral to or molded as a unitary piece with basin 102 such that it extends from a lower and/or rear portion of basin 102. In such configurations no attachment elements may be needed.

By way of example and not limitation, compression pad 104 can be injection molded or otherwise formed along with basin 102, thereby forming a single unitary component. In some embodiments compression pad 104 can be permanently secured to basin 102, such as for example through the use of an adhesive or other bonding compound. Alternatively, compression pad 104 can be attached to basin 102 using a securing systems 70 as illustrated in FIG. 3E and discussed hereinabove.

Bird feeder 100, an example of a window hanging device 10, can be installed in the same manner as window hanging device 10 in FIGS. 1A-1C. That is, feeder 100 is secured by compression pad 104 being sandwiched (or otherwise secured) between window frame 60 and window sill 58 when window frame 60 is in a closed position. The interface 62 between window frame 60 and window sill 58 provides sufficient space for compression pad 104 even when the window is in a fully closed and locked position. This orientation of compression pad 104 in the closed window secures feeder 100 on the outside of the window and prevents it from falling. Feeder 100 is further supported by resting on exterior window sill ledge 50.

Basin 102 can, in any of the embodiments herein, comprise basin with an attached (integral) or detachable cover 106. In some embodiments cover 106 can extend about 3 inches, about 4 inches, about 5 inches, about 6 inches, about 7 inches, about 8 inches, about 9 inches or about 10 inches or more above basin 102. The height and/or size of the opening between basin 102 and cover 16 can be any suitable size sufficient to allow birds to access the interior of the basin to feed and a user to access the interior of the basin to refill with bird seed/feed and maintain the feeder.

Basin 102 can be provided in various sizes and dimensions, such as for example about 10 inches, about 12 inches, about 14 inches, about 16 inches, about 18 inches, or about 20 inches long, by about 2 inches, about 3 inches, about 4 inches, or about 5 inches wide, by about 1 inch, about 2 inches, about 3 inches or about 4 inches high. Basin 102, as well as cover 16 can be made of a plastic, in some embodiments a clear plastic, a polymer, a metal, a ceramic, glass, terra cotta or clay, wood, coated fabric, fabric or basket material (e.g., with a plastic or similar hard material as an interior liner), or any other suitable material. In some embodiments, basin 102 and cover 106 comprise about 1/16 inch, about 1/8 inch or about 1/4 inch or more of thick clear plastic. These components, as well as others, can in some embodiments be injection molded, thermo molded, roto molded, blow molded, 3D printed, poured, crafted/handcrafted, carved, dipped, woven, or made by other suitable manufacturing method.

Compression pad 104 can comprise any suitable material, including but not limited to marine cloth, marine vinyl, silicone, plastic, leather, fabric, mesh or similar netting, yarn, twine, malleable metal, rubber, oil cloth, or any other similar and/or pliable material. Suitable materials are those that are pliable enough to be compressed between a window frame and window sill, yet strong enough to hold the feeder in position. Compression pad 104 can be provided of any suitable length and/or width and/or thickness, so long as it is sufficiently sized to be compressed or secured between a closed window frame and the window sill. For example, compression pad 104 can be about 10 inches, about 11 inches, about 12 inches, about 13 inches, about 14 inches, about 15 inches, about 16 inches, about 17 inches or about 20 inches long, by about 6 inches, about 7 inches, about 8 inches, about 9 inches or about 10 inches wide, with a thickness of about 1/64 inches, 1/32 inches or about 1/16 inches.

In some embodiments the compression pad may consist of two, three or more separate strips of material rather than a single strip pad. Such strips would be affixed in the same or similar fashion as the single strip pad would be and would function in a similar fashion. Such strips can in some embodiments be about 1 inch wide each, about 2 inches wide each, or more.

In some embodiments compression pad 104 can further comprise a weight 140 at a terminal end 142 that resides inside the house or building when in the installed position. Weight 140 can be configured to hold compression pad 104 against the interior window sill and wall, and retain it in place until moved by a user. Weight 140 can comprise a metal bar for example, and can be sewn into the material of compression pad 104 or otherwise affixed to compression pad 104 or a medallion-like object affixed to the pad. Weight 140 can also be configured, as shown in FIGS. 7A, 7C and 7D, as a handle to both hold the compression pad 104 against the interior window sill and wall and to enhance a user's ability to grip and control compression pad 104. In some embodiments where the material of compression pad 104 is a sufficiently pliable material, weight 140 may not be necessary and can be optional. Also, without such weight, one embodiment could permit the terminal end 142 to be cut to a length to allow it to drape on the inside window sill in a manner preferred by the user.

As depicted in FIGS. 7A, 7B and 7D, cover 106 can be integrated into basin 102. Alternatively, as illustrated in FIGS. 7A and 7B, cover 106 can be joined to basin 102 at a joint 126 or seam. Thus, cover 106 and basin 102 can in some aspects be separate or modular piece such that cover 106 can be affixed to basin 102 as needed or desired. Feeder 100 can be used with or without cover 106 as the conditions, e.g. location used, weather, season, etc. dictate or the user prefers.

Figure 7F:
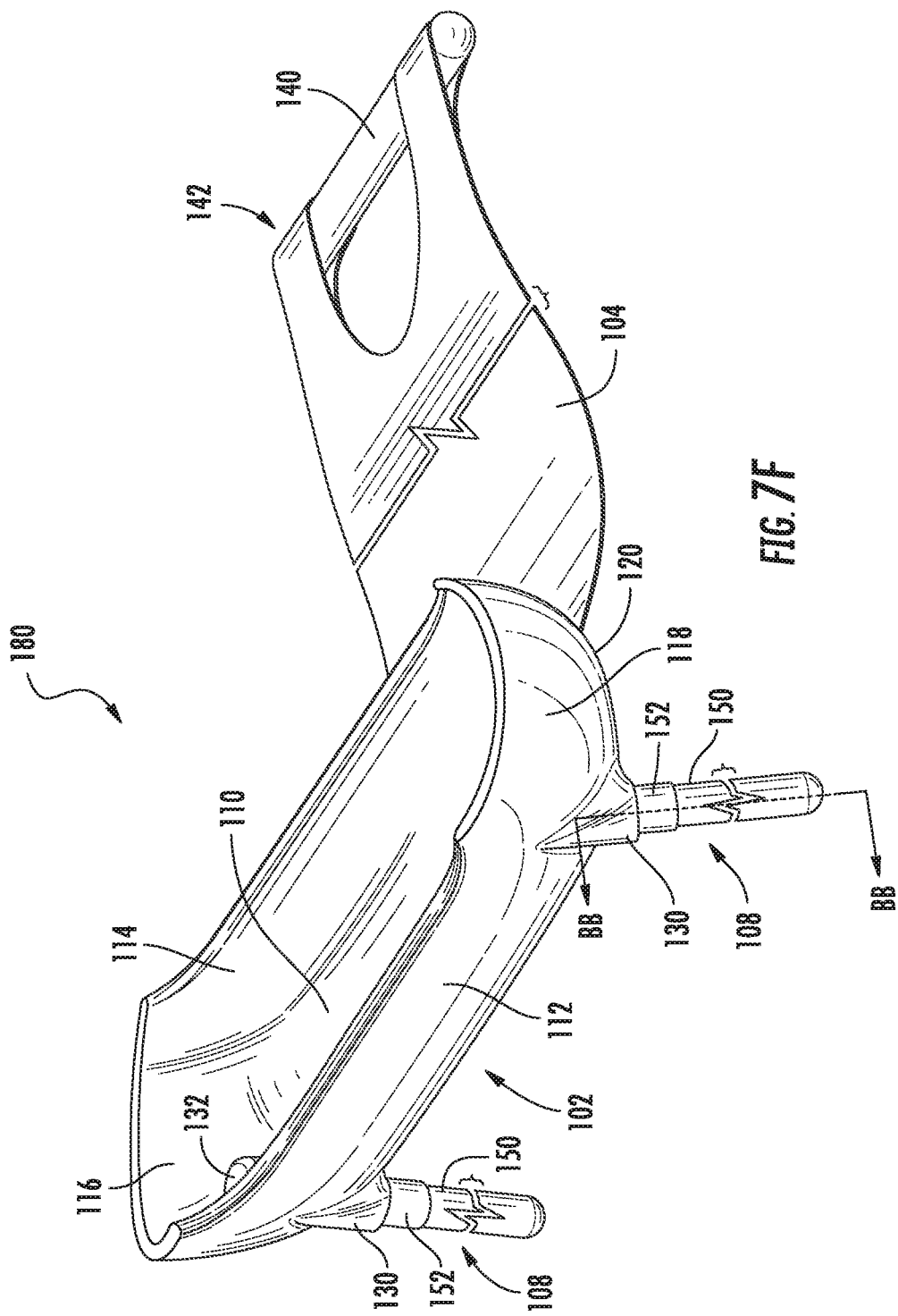
FIG. 7F is a perspective view of a window hanging device configured as an alternate embodiment of a bird feeder.

As depicted in FIG. 7F, in some embodiments a bird feeder 180 disclosed herein can comprise a basin 102, a compression pad 104 and one or more adjustable support members 108. Feeder 180 is the same as feeder 100 illustrated in FIGS. 7A-7D, and discussed hereinabove, but without a cover.

In some embodiments feeder 100 as depicted in the figures can be provided as a kit. The kit can comprise one or more of basin 102, compression pad 104, cover 106 (affixed or detachable), adjustable support member 108, attachment elements 160 and one or more additional attachment elements as needed. Such a kit can further comprise instructions for assembling the feeder.

In some embodiments the feeders disclosed herein can be assembled and/or installed as set forth below. In some embodiments one or more adjustable support members 108 (also referred to as "leveling screws") can be inserted or threaded into sockets 130. For embodiments where compression pad 104 is not integrated and is instead modular, one or more attachment elements 160 can be used to affix or secure compression pad 104 to basin 102. Once assembled, feeder 100 can be installed in a window. First, the assembled unit can be placed on the exterior window ledge with the outer adjustable support members 108 resting on the outside part of the exterior ledge 50. With the entire basin 102 resting on the ledge/sill 50, the inner portion of compression pad 104 can be placed inside the bottom track of the window frame (the metal multi-level lip onto which the window closes). The portion of compression pad 104 inside the window should be held securely by the person installing the feeder (by pinching it between a thumb and fingers, or by placing the palm or side of a hand on top of the compression pad pressing it down onto the inside window sill to hold it in place or in some embodiments, holding the handle 140 attached to the terminal end 142 of the compression pad) while the window is gently lowered toward a closed position until the bottom of the window is slightly below the top of feeder basin 102. Compression pad 104 can be slowly pulled inward until the inner side of basin 102 is almost touching the window, leaving a little slack which will be tightened by the closing of the window. The window can be slowly closed all the way to insure it seals and pulls any slack from the pad, thereby moving the inner wall of the basin inward until "snug" against the outside of the window. The window can be locked to insure proper placement. If necessary, while holding the compression pad, the window may be re-opened at this point in order to raise or lower the adjustable support members so the feeder is level or substantially level. The window may then be re-closed and locked. At this point the feeder is properly installed.

To attend to or fill the feeder with bird seed/feed a user should, with one hand, hold compression pad 104 while, with the other hand, unlock and open the window. It may be useful to ensure that adjustable support members 108 are still resting on the outer portion of the exterior window ledge. While still holding compression pad 104 the window can be opened sufficiently to place and pour bird seed/feed into the top of basin 102. Once the feeder is full, the window can be slowly closed and locked to secure the feeder, now filled with bird seed/feed, into place. If necessary, as the window is closing, a gentle pull inward on compression pad 104 can insure the inside wall of basin 102 rests against the outside window glass once the window is completely closed. Finally, the disclosed feeder is configured such that the window can be locked to insure the feeder remains in place and for home or facility security purposes.

Thus, a significant advantage of the presently disclosed feeder designs is that to fill the feeder one need only to hold onto the portion of the compression pad that is inside the building/structure, unlock and open the window, and pour bird feed into the basin with the other hand. Then, while still holding onto the inside portion of the compression pad, the window is lowered onto the pad and locked in place. A user therefore never has to leave the comfort and safety of the home or dwelling to attend to the feeder. Moreover, because the feeder sits directly against the outside of the window, it allows for maximum enjoyment of all facets of the art of bird watching.

In each of the embodiments disclosed herein, variations, alterations and/or optimizations in design and/or materials used are contemplated to be within the purview of one of ordinary skill in the art without departing from the scope of the instant disclosure. For example, the basin can in some embodiments be made of different materials, and can be of different shapes and/or sizes, as long as it fits onto the outer window sill and/or is able to be affixed to the window by use of the compression pad and/or the adjustable support members. The basin could even be wooden and of different colors (or paintable) to match the outside of a house or dwelling.

Moreover, in some embodiments the basin could have drainage holes or tiny diameter mesh as a bottom to allow water drainage, but still keep seed/bird feed in the basin. In some embodiments the basin could be configured to be surrounded by a seed drip tray, i.e. a flat projection at the bottom and on three sides (excluding the window side) of the basin with a small raised lip all around it at the outer perimeter. This would serve as both a perch for the birds and an overflow seed catch so that feed spilled out of the basin or dropped by the birds would land on this tray rather than the ground. Birds could then perch on the tray and eat this overflow seed.

As discussed herein, the compression pad can be made of any suitable material that allows the feeder to be secured on a window sill by closing the compression pad affixed thereto in a window. Moreover, the compression pad, where it is not integrated into the basin, can be affixed to the basin by any appropriate means, such as for example affixed by screws, screws and nuts, pegs, rivets, cotter pins, glue, velcro, an elongated plate sandwiching the pad between itself and the bottom of the basin and affixed to the basin bottom so as to hold the pad in place, etc.

Compression pad could be made of stronger moldable, malleable material, similar to a thin malleable metal or composite material, e.g. a thick aluminum foil or tin material, that could be bent to conform to the shape of the grooves in the window track at the bottom of the window. In one embodiment of the bird feeder, this malleable metal compression pad may be shaped to form a basin to rest on the outside window sill and hold bird feed/seed. Thus, the pad and the feeder would be a single unit to be used with or without adjustable support members as needed.

Furthermore, instead of the compression pad being of uniform width which leaves an approximately 9 inch wide segment of pad on the inside window to hold on to when filling the feeder, this part could be trimmed to measure about 3 to 4 or more inches (just enough to hold on to) and thereby decrease the footprint of the pad that is visible from inside. In some embodiments this could be more aesthetically pleasing. If additional holding ability is sought in this embodiment consisting of a narrower pad, two or more such pads may be attached to the basin alongside each other with or without space in between each and affixed by any of the same means employed for a single wider pad.

In some embodiments, provided herein are methods of securing an item from a window and/or hanging an item of interest from a window sill. Such methods can comprise providing an item of interest and attaching a compression pad thereto, or providing a compression pad with an attachment element and then attaching the same to the item of interest. Then, the compression pad can be secured by sandwiching (or otherwise securing) it between the window frame and window sill when the window frame is in a closed position. The interface between the window frame and the window sill provides sufficient space for the compression pad even when the window is in a fully closed and locked position. This orientation of the compression pad in the closed window secures the item on the outside or inside of the window and prevents it from falling. The method can further comprise attaching support elements to the item, or where already provided as part of the item, adjusting the height or position of the support elements to level and/or support the feeder on the window sill ledge, or where no ledge or sill is present, against a surface or wall of the structure. The item can be further supported by resting on an exterior or interior window sill ledge (or on the inside, the window frame/trim/inside sill). Where no ledge or sill is present, the item can be supported against a surface or wall of the structure.

In some embodiments, provided herein are methods of feeding birds, the methods comprising providing a bird feeder with an affixed compression pad, or providing a bird feeder and attaching a compression pad thereto. Next, the bird feeder can be secured to or near a window by sandwiching (or otherwise securing) the compression pad between the window frame and window sill when the window frame is in a closed position. The interface between the window frame and the window sill provides sufficient space for the compression pad even when the window is in a fully closed and locked position. This orientation of the compression pad in the closed window secures the attached bird feeder on the outside of the window and prevents it from falling. The bird feeder can be further supported by resting on an exterior or interior window sill ledge. The method can further comprise attaching support elements to the bird feeder, or where already provided as part of the bird feeder, adjusting the height or position of the support elements to level and/or support the feeder on the window sill ledge, or where no ledge or sill is present, against a surface or wall of the structure. The method can further comprise filing the bird feeder with bird seed or other feedstuff as desired.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The term "comprising", which is synonymous with "including," "containing," or "characterized by" is inclusive or open-ended and does not exclude additional, unrecited elements or method steps. "Comprising" is a term of art used in claim language which means that the named elements are present, but other elements can be added and still form a construct or method within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A compression pad window hanging device comprising:
   an item to be secured by a lower sash of a window;
   a compression pad attached to the item and extending from a portion of the item; and
   one or more adjustable support members;
   wherein the compression pad is configured to be compressed between the lower sash of a closed window and a window sill and/or window jamb to thereby secure the item in place on an exterior or interior of the window,
   wherein the item is configured to be secured by a lower window sash and rest on an exterior or interior window sill ledge on the outside or inside of a window,
   wherein the adjustable support members comprise a material sufficiently flexible to be moldable or otherwise adjustable to a desired height or position, yet rigid enough to support a weight of the hanging device.

2. The compression pad window hanging device of claim 1, wherein the one or more adjustable support members extend from a bottom of the item, wherein the one or more adjustable support members are configured to support the item on the exterior or interior window sill ledge and compensate for a downward slope of the exterior or interior window sill ledge, and/or to support the item against a structure or building where there is no sill.

3. The compression pad window hanging device of claim 1, wherein the compression pad is permanently affixed to the item and extends in a planar direction away from a portion of the item.

4. The compression pad window hanging device of claim 1, wherein the compression pad is secured to the item by an attachment element.

5. The compression pad window hanging device of claim 1, further comprising an attachment element attached to the compression pad and configured to support or secure the item.

6. The compression pad window hanging device of claim 1, wherein the compression pad comprises a sheet of material sufficiently flexible to be sandwiched between the sash of a closed window and a window sill yet sufficiently strong to securely hold the item in place.

7. The compression pad window hanging device of claim 1, wherein the item comprises a bird feeder, disposable bird feeder, a bird house, a bird bath, a hummingbird feeder, a squirrel feeder, a planter, a planter with a trellis, a basket, a security camera, a decoration, ornamental component, a flag, a sign or a banner.

8. A bird feeder comprising:
   a basin comprising one or more sides and a bottom and configured to hold bird seed;

a compression pad attached to the basin and extending from a bottom rear portion of the basin; and one or more adjustable support members extending from the bottom of the basin;

wherein the bird feeder is configured to rest on an exterior window sill ledge on the outside of a window, wherein the compression pad is configured to be compressed between a closed window and a window sill to thereby secure the feeder in place on the exterior window sill ledge, and wherein the one or more adjustable support members are configured to support the feeder on the exterior window sill ledge and compensate for a downward slope of the exterior window sill ledge, wherein the adjustable support members comprise a material sufficiently flexible to be moldable or otherwise adjustable to a desired height or position, yet rigid enough to support a weight of the basin.

9. The bird feeder of claim 8, wherein the one or more adjustable support members are integrated into the bottom of the basin.

10. The bird feeder of claim 8, wherein the one or more adjustable support members are removable.

11. The bird feeder of claim 8, wherein the compression pad is permanently affixed to the bottom of the basin and extends in a planar direction away from a rear portion of the basin.

12. The bird feeder of claim 8, wherein the compression pad is secured to the bottom of the basin by an attachment element, wherein the compression pad comprises a sheet of material sufficiently flexible to be sandwiched between a closed window and a window sill yet sufficiently strong to securely hold the bird feeder in place.

13. The bird feeder of claim 8, further comprising a cover extending above the basin and configured to allow access to the basin from a front and rear portion of the basin.

14. The bird feeder of claim 13, wherein the cover and basin are molded as a single unitary piece, wherein the basin and cover are injection, thermo, roto or blow molded as a single unitary piece.

15. The bird feeder of claim 13, wherein the cover and basin are separate pieces, wherein the cover is configured to be attached to the basin, wherein the cover is configured to be removable.

16. A bird feeder kit comprising:

a basin comprising one or more sides and a bottom and configured to hold bird seed;

a compression pad configured to be attachable to the basin;

one or more adjustable support members configured to be attachable to the basin;

hardware for attaching the compression pad to the basin; and instructions for assembling and using the bird feeder, wherein in an assembled condition the bird feeder is configured to rest on a window sill on the outside of a window, wherein the compression pad is configured to be compressed between a closed window and the window sill to thereby secure the bird feeder in place on the window sill, and wherein the one or more adjustable support members are configured to support the bird feeder on the window sill and compensate for a downward slope of the window sill, wherein the bird feeder is configured to be supported on a surface below a window where no window sill is present.

17. The bird feeder kit of claim 16, further comprising a cover configured to be attachable to the basin.

* * * * *